United States Patent
Weber et al.

(10) Patent No.: US 9,488,766 B2
(45) Date of Patent: Nov. 8, 2016

(54) PARTIALLY REFLECTING MULTILAYER OPTICAL FILMS WITH REDUCED COLOR

(71) Applicant: 3M INNOVATIVE PROPERTIES COMPANY, St. Paul, MN (US)

(72) Inventors: Michael F. Weber, Shoreview, MN (US); Carl A. Stover, Saint Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/942,648

(22) Filed: Nov. 16, 2015

(65) Prior Publication Data
US 2016/0077266 A1 Mar. 17, 2016

Related U.S. Application Data

(63) Continuation of application No. 13/698,754, filed as application No. PCT/US2011/035967 on May 10, 2011, now Pat. No. 9,188,790.

(60) Provisional application No. 61/347,072, filed on May 21, 2010.

(51) Int. Cl.
G02B 5/30 (2006.01)
G02B 5/28 (2006.01)
(Continued)

(52) U.S. Cl.
CPC ......... *G02B 5/3066* (2013.01); *B29C 47/0021* (2013.01); *B29C 47/0057* (2013.01); *B29D 11/0073* (2013.01); *B32B 7/02* (2013.01); *G02B 5/285* (2013.01); *G02B 5/305* (2013.01); *G02B 5/3041* (2013.01); *G02B 27/141* (2013.01);
(Continued)

(58) Field of Classification Search
CPC G02B 5/3041; G02B 5/3066; G02B 5/3083; G02B 27/283
USPC ............ 359/485.03, 489.08, 489.11, 489.12, 359/489.13, 900
See application file for complete search history.

(56) References Cited

U.S. PATENT DOCUMENTS 3,610,729 A 10/1971 Rogers
4,047,805 A 9/1977 Sekimura
(Continued)

FOREIGN PATENT DOCUMENTS

EP 1 258 745 11/2002
WO WO 95/17303 A1 6/1995
(Continued)

*Primary Examiner* — Ricky D Shafer
(74) *Attorney, Agent, or Firm* — Daniel J. Iden

(57) ABSTRACT

A multilayer optical film body includes a first and second packet of microlayers. Each packet partially transmits and partially reflects light over an extended wavelength range, such as the visible region, for normally incident light polarized along a first principal axis of the film body. In combination, the first and second packets have an intermediate reflection and transmission (e.g. 5-95% internal transmission, on average) for the normally incident light, and similar intermediate reflection/transmission (e.g. 10-90% internal transmission, on average) for oblique light. The packets are laminated or otherwise connected so that light can pass through the packets sequentially. In at least a first test area of the film body, a high frequency spectral variability of the combination of packets is less than a high frequency spectral variability of the first packet by itself, and may also be less than a high frequency spectral variability of the second packet by itself.

32 Claims, 15 Drawing Sheets

(51) Int. Cl.
*G02B 27/14* (2006.01)
*B29C 47/00* (2006.01)
*B29D 11/00* (2006.01)
*B32B 7/02* (2006.01)
*G02B 27/28* (2006.01)

(52) U.S. Cl.
CPC ............ *G02B 27/142* (2013.01); *G02B 27/144* (2013.01); *G02B 27/283* (2013.01); *Y10T 156/10* (2015.01)

(56) References Cited

U.S. PATENT DOCUMENTS

| | | |
|---|---|---|
| 4,446,305 A | 5/1984 | Rogers |
| 4,896,928 A | 1/1990 | Perilloux |
| 5,486,949 A | 1/1996 | Schrenk |
| 5,882,774 A | 3/1999 | Jonza |
| 6,208,466 B1 | 3/2001 | Liu |
| 6,368,699 B1 | 4/2002 | Gilbert |
| 6,486,997 B1 | 11/2002 | Bruzzone |
| 6,531,230 B1 | 3/2003 | Weber |
| 6,697,195 B2 | 2/2004 | Weber |
| 6,783,349 B2 | 8/2004 | Neavin |
| 7,019,905 B2 | 3/2006 | Weber |
| 7,023,602 B2 | 4/2006 | Aastuen |
| 7,064,897 B2 | 6/2006 | Hebrink |
| 7,256,936 B2 | 8/2007 | Hebrink |
| 8,917,448 B2 | 12/2014 | Weber |
| 9,188,790 B2 * | 11/2015 | Weber .................. G02B 5/285 |
| 2006/0221446 A1 | 10/2006 | Hebrink |
| 2006/0232863 A1 | 10/2006 | Nevitt |
| 2008/0003419 A1 | 1/2008 | Hebrink |
| 2008/0030858 A1 | 2/2008 | Wada |
| 2008/0037127 A1 | 2/2008 | Weber |
| 2008/0151147 A1 | 6/2008 | Weber |
| 2010/0165660 A1 | 7/2010 | Weber |
| 2011/0102891 A1 | 5/2011 | Derks |
| 2011/0222263 A1 | 9/2011 | Weber |
| 2011/0222295 A1 | 9/2011 | Weber |
| 2011/0279997 A1 | 11/2011 | Weber |
| 2012/0206674 A1 | 8/2012 | Weber |
| 2012/0206806 A1 | 8/2012 | Weber |
| 2012/0275023 A1 | 11/2012 | Weber |
| 2013/0042964 A1 | 2/2013 | Neavin |

FOREIGN PATENT DOCUMENTS

| | | |
|---|---|---|
| WO | 00/07046 A1 | 2/2000 |
| WO | WO 2008/144636 | 11/2008 |
| WO | WO 2008/144644 | 11/2008 |
| WO | WO 2008/144656 | 11/2008 |
| WO | WO 2009/123928 | 10/2009 |
| WO | WO 2011/050226 | 4/2011 |
| WO | WO 2011/050233 | 4/2011 |
| WO | WO 2011/050268 | 4/2011 |

* cited by examiner

PARTIALLY REFLECTING MULTILAYER OPTICAL FILMS WITH REDUCED COLOR

FIELD OF THE INVENTION

This invention relates generally to optical films whose reflection and transmission characteristics are determined in large part by constructive and destructive interference of light reflected from interfaces between microlayers within the film, with particular application to such films that partially reflect and partially transmit light over an extended wavelength range for a given incidence condition. The invention also relates to associated articles, systems, and methods.

BACKGROUND

Multilayer optical films are known. Such films typically incorporate a large number of very thin layers of different light transmissive materials, the layers being referred to as microlayers because they are thin enough so that the reflection and transmission characteristics of the optical film are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example.

Reflective polarizers composed of a plurality of microlayers whose in-plane refractive indices are selected to provide a substantial refractive index mismatch between adjacent microlayers along an in-plane block axis and a substantial refractive index match between adjacent microlayers along an in-plane pass axis, with a sufficient number of layers to ensure high reflectivity for normally incident light polarized along one principal direction, referred to as the block axis, while maintaining low reflectivity and high transmission for normally incident light polarized along an orthogonal principal direction, referred to as the pass axis, have been known for some time. See, e.g., U.S. Pat. No. 3,610,729 (Rogers), U.S. Pat. No. 4,446,305 (Rogers et al.), and U.S. Pat. No. 5,486,949 (Schrenk et al.).

More recently, researchers from 3M Company have pointed out the significance of layer-to-layer refractive index characteristics of such films along the direction perpendicular to the film, i.e. the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta nz$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. Over the years, designers and manufacturers of the latter type of films, i.e., broadband multilayer optical films, have had to deal with the issue of color. The color issue often arises when the film is intended for use in a visual display system, e.g., where the film is a broadband reflective polarizer or a broadband mirror, and the display system is a liquid crystal display, luminaire, or backlight. In such systems, it is typically undesirable for the film to impart a significant colored (non-white) appearance to the display, whether at normal incidence or for obliquely incident light. The colored appearance occurs when the film has transmission or reflection characteristics that are not uniform over the visible portion of the spectrum. In the case of coextruded polymeric multilayer optical films, such non-uniformities are typically the result of imperfect control of the layer thickness profile of the film relative to a target profile. To avoid the color issue, polymeric multilayer optical films are often designed to provide along their principal axes either extremely low reflectivity and high transmission (e.g. for a pass axis of a reflective polarizer) or extremely high reflectivity and low transmission (e.g. for a block axis of a reflective polarizer, or for any in-plane axis of a reflective mirror film). Forcing the reflectivity to extremely low or extremely high values (and the transmission to extremely high or extremely low values, respectively) results in low-color broadband films, because the magnitude of spectral non-uniformities in reflection or transmission is smaller for a given variability in layer thickness profile when the nominal reflectivity is near 0 (0%) or 1 (100%), and the nominal transmission is near 1 or 0, respectively.

Recently, broadband polymeric multilayer optical films have been proposed that have intermediate amounts of reflectivity and transmission for light polarized parallel to at least one principal optic axis so that some significant amount of incident light is reflected, and another significant amount of the incident light (typically, the remainder of the incident light that is not reflected) is transmitted. Such films are referred to herein as partially reflecting multilayer optical films, or partially transmitting multilayer optical films. One approach to addressing color issues in such films is to provide them with only a single packet of microlayers with a carefully tailored layer thickness profile, and to manufacture them without the use of any layer multiplier devices, to provide maximum control of the layer thickness profile and a corresponding minimum spectral variability in transmission or reflection over the visible wavelength range. Reference is made, for example, to PCT publication WO 2009/0123928 (Derks et al.), "Low Layer Count Reflective Polarizer With Optimized Gain".

BRIEF SUMMARY

Thus, as already mentioned above, one challenge faced by designers and manufacturers of polymeric multilayer optical films that are intended to be both (1) partially reflecting along a principal axis and (2) broadband (i.e., intended to provide partial reflectivity over a broad wavelength range) is unintended and undesired perceived color resulting from imperfect layer thickness control. Such undesired color is typically manifested as relatively high frequency variability in the optical transmission and reflection spectra, the high frequency variability being directly associated with deviations in the thicknesses of the microlayers (stated more accurately, deviations in the optical thicknesses of optical repeat units of microlayers) from their ideal or target values. This challenge facing manufacturers and designers of partially reflecting broadband multilayer optical films is explained further below with reference to FIGS. 1-3, in the Detailed Description portion of this document.

Multilayer optical films of particular interest to the present application are films that are partially reflective and partially transmissive over a wide wavelength range of interest, along at least one principal in-plane axis, both for normally incident light and obliquely incident light. Such films may be characterized by the "internal transmission" of the film or of one or more of its constituent components for a specified light incidence condition. The "internal transmission" of a film refers to the transmission of the film when any effects of the front-most and rear-most surfaces of the film/component, which surfaces may or may not be in contact with air, are not included in the measurement.

Thus, the internal transmission of a film refers to the transmission that results only from interior portions of the film/component, and not the two outer surfaces thereof. Completely analogous to internal transmission is "internal reflection". Thus, the internal reflection of a film refers to the reflection that results only from interior portions of the film/component, and not the two outermost surfaces thereof. Characterizing a multilayer optical film or other optical body in terms of its internal transmission and/or internal reflection can be beneficial and helpful in many situations. For clarity, when terms such as "reflection" and "transmission" (and related terms such as reflectivity and transmissivity) are used in this document in connection with a multilayer optical film or other optical body or portion thereof, the reader will understand that they may refer, depending on the context, to the ordinary reflection and transmission of the body, which usually (except for p-polarized light incident at Brewster's angle) include the effects of the two outermost surfaces, or to the internal reflection and transmission of the body, or to both. When the effects of the outermost surfaces are intended to be specifically excluded, the adjective "internal" is used throughout this document.

The present application discloses, among other things, partially transmitting multilayer optical film bodies that result in reduced color by combining, for example by lamination, two separate multilayer optical films or microlayer packets whose respective high frequency spectral peaks and valleys tend to cancel each other over a broad wavelength range of interest and at at least some areas of the film body. In practice, multilayer optical films and microlayer packets can exhibit spatial non-uniformities such that spectral peaks and valleys shift slightly in wavelength from one area or place on the film or packet to the next. Even when such spatial non-uniformities result in another area of the construction at which the respective spectral peaks and valleys of the different films or packets do not tend to cancel each other, we have found that the color of such non-optimal areas typically increases by only a modest amount, such that the overall construction may still have a reduced color on average, where the average may include a spatial average over the useful area of the film construction.

Thus, for example, partially reflective coextruded multilayer optical film bodies can be made that have, compared to previous designs, a flatter or smoother transmission spectrum over the wavelength range of interest, at least in some areas or portions of the film body, and/or when considering a spatial average over all points on the film body. The film bodies may be made with two or more multilayer packets and two or more corresponding continuous layer profiles, slightly adjusted in thickness or shape with respect to one another, where the reflection band for each packet substantially spans the entire wavelength range of interest. This is different from film bodies that use only one multilayer packet and only one corresponding continuous layer profile whose reflection band spans the wavelength range of interest. Such a single packet film body can be considered to be more efficient than the described film bodies made with two or more multilayer packets, because the single packet film body can use a smaller total number of microlayers to produce the reflection band with a specified amount of reflectivity over the wavelength range of interest. See e.g. PCT publication WO 2009/0123928 (Derks et al.). But even though the disclosed multi-packet designs are typically less efficient from an optical standpoint than single packet designs, we have found that they can provide better overall spectral uniformity across the wavelength range when considering the entire useable area of the film body.

The present application therefore discloses, among other things, multilayer optical film bodies that include a first and second packet of microlayers. In some cases, the film body may include no microlayer packets other than the first and second packets, while in other cases the film body may include one or more other microlayer packets. The first packet of microlayers may be configured to partially transmit and partially reflect light over an extended wavelength range, such as the visible region, for normally incident light polarized along a first principal axis of the film body, and the second packet of microlayers may also be configured to partially transmit and partially reflect light over the extended wavelength range for the same normally incident linearly polarized light. In combination, the first and second packets may have a significant amount of reflection and transmission (e.g., internal transmission, averaged over the extended wavelength range, in a range from 5-95%) for the normally incident light, and similar partial reflection and transmission for oblique light, e.g., p-polarized light incident from air at a 60 degree angle in a plane containing the first principal axis. In combination, the first and second packets may have an internal transmission in a range from 0.1 (10%) to 0.9 (90%), or from 0.2 to 0.8, or from 0.3 to 0.7, for the 60 degree p-polarized light when averaged over the extended wavelength range. In some cases, the internal transmission for the 60 degree oblique p-polarized light may be less than the internal transmission for the normally incident light, e.g., if the microlayers reflect p-polarized light more strongly with increasing incidence angle. In other cases, the internal transmission for the 60 degree oblique p-polarized light may be greater than the internal transmission for the normally incident light, e.g., if the microlayers reflect p-polarized light more weakly with increasing incidence angle. In still other cases, the internal transmission for the 60 degree oblique p-polarized light may be substantially the same as the internal transmission for the normally incident light.

The first and second packets of microlayers may be connected such that at least some light can pass through the first and second packets of microlayers sequentially. In at least a first test area of the multilayer optical film body, a high frequency spectral variability ($\Delta$comb) of the combination of first and second packets may be less than a high frequency spectral variability ($\Delta 1$) of the first packet by itself, and may also be less than a high frequency spectral variability ($\Delta 2$) of the second packet by itself. In some cases, $\Delta$comb may be the same as the high frequency spectral variability ΔFB of the multilayer optical film body over the same extended wavelength range, particularly when the film body includes no microlayer packets other than the first and second packet.

The first packet of microlayers may exhibit a first transmission spectrum over the extended wavelength range for the normally incident light, the first transmission spectrum having the first high frequency spectral variability Δ1. The second packet of microlayers may exhibit a second transmission spectrum over the extended wavelength range for the normally incident light, the second spectrum having the second high frequency spectral variability Δ2. A difference between the first and second transmission spectra may yield a first differential transmission spectrum over the extended wavelength range, the first differential transmission spectrum having a first differential high frequency spectral variability Δdiff. A combination of the first and second transmission spectra may yield a first combination transmission spectrum over the extended wavelength range, the first combination transmission spectrum having the high frequency spectral variability Δcomb. The multilayer optical film body may exhibit a first film body transmission spectrum over the extended wavelength range for the normally incident light, the first film body transmission spectrum having the first film body high frequency spectral variability ΔFB. (In cases where the multilayer optical film body consists essentially of the first and second packets of microlayers, with at least one or more optically thick light transmissive layers, the first combination transmission spectrum may be substantially the same as the first film body transmission spectrum, and Δcomb may be substantially the same as ΔFB.) The film body is preferably constructed in such a way that Δdiff is greater than at least one of Δ1 and Δ2. Furthermore: Δdiff may be greater than each of Δ1 and Δ2; Δcomb and/or ΔFB may be less than at least one of Δ1 and Δ2; and Δcomb and/or ΔFB may be less than each of Δ1 and Δ2.

The first transmission spectrum, the second transmission spectrum, the first differential transmission spectrum, the first combination transmission spectrum, and the first film body spectrum may be internal transmission spectra, or they may be ordinary (external) transmission spectra. These transmission spectra may each have a measurement resolution of 5 nm or less, which is well within the capability of most spectrophotometers. The first test area may be selected such that any given spectral feature of the film body shifts in wavelength by less than a specified amount, e.g. about 5 nm, between any two portions of the first test area. For many multilayer optical film bodies and most spectrophotometers, this test area ranges from about 1 mm$^2$ to 1 cm$^2$. The extended wavelength range of interest may include at least a majority of a range from 400 nm to 700 nm, e.g., from 420 to 680 nm, or from 420 nm to a wavelength greater than 680 nm, such as 420 to 1000 nm.

Any given high frequency spectral variability may be a variability based on a difference between the pertinent transmission spectrum and a best-fit curve to the transmission spectrum over the wavelength range of interest, the best-fit curve being of the form $a_0+a_1\lambda, +a_2\lambda^2+a_3\lambda^3$, for example, where $\lambda$ is the optical wavelength. The high frequency spectral variability may be a standard deviation of the difference between the transmission spectrum and the corresponding best-fit curve. Thus, Δ1 may be based on a difference between the first transmission spectrum and a first best-fit curve to the first transmission spectrum over the wavelength range of interest, the first best-fit curve being of the form $a_0+a_1\lambda, +a_2\lambda^2+a_3\lambda^3$. The parameter Δ2 may similarly be based on a difference between the second transmission spectrum and a second best-fit curve to the second transmission spectrum over the wavelength range of interest, the second best-fit curve also being of the form $a_0+a_1\lambda, +a_2\lambda^2+a_3\lambda^3$. The parameter Δdiff may also be based on a difference between the first differential transmission spectrum and a first differential best-fit curve to the first differential transmission spectrum over the wavelength range of interest, the first differential best-fit curve also being of the form $a_0+a_1\lambda, +a_2\lambda^2+a_3\lambda^3$. The first and second packets in combination may exhibit a first combination transmission spectrum over the extended wavelength range for the normally incident light, the first combination transmission spectrum having the high frequency spectral variability Δcomb, where Δcomb may be based on a difference between the first combination transmission spectrum and a first combination best-fit curve to the first combination transmission spectrum over the wavelength range of interest, the first combination best-fit curve also being of the form $a_0+a_1\lambda, +a_2\lambda^2+a_3\lambda^3$.

The first and second packets may be the same or similar to each other in construction, and may have the same or similar transmission and reflection characteristics when considered individually. The first transmission spectrum, for example, may have a first average value over the wavelength range of interest, and the second transmission spectrum may have a second average value over the same wavelength range, and the first average value may differ from the second average value by less than 0.2, or less than 0.1, for example. The first average value may be substantially the same as the second average value.

The first packet may have substantially the same number of microlayers as the second packet. The first and second packets of microlayers may each be characterized by nominally monotonic layer thickness profiles of optical repeat units.

In a second test area of the multilayer optical film body different from the first test area, the first packet may exhibit a third transmission spectrum over the extended wavelength range for the normally incident light, the third transmission spectrum having a third high frequency spectral variability Δ3, and the second packet of microlayers may exhibit a fourth transmission spectrum over the extended wavelength range for the given incidence condition, the fourth transmission spectrum having a fourth high frequency spectral variability Δ4. A difference between the third and fourth transmission spectra may yield a second differential spectrum over the extended wavelength range, the second differential spectrum having a second differential high frequency variability Δdiff2. In the second test area, the combination of the first and second packets may exhibit a second combination transmission spectrum over the extended wavelength range for the normally incident light, the second combination transmission spectrum having a second combination high frequency spectral variability Δcomb2. Δdiff2 may in some cases be less than at least one of Δ3 and Δ4. Furthermore: Δdiff2 may be less than each of Δ3 and Δ4; and Δcomb2 may be greater than at least one of Δ3 and Δ4.

Also disclosed are methods of making partially reflective multilayer optical film bodies, such methods including providing a first packet of microlayers, providing a second packet of microlayers, and connecting the first and second packets to form the multilayer optical film body such that at least some light can pass through the first and second packets sequentially. The first packet may be configured to partially transmit and partially reflect light over an extended wavelength range for normally incident light polarized along a first principal in-plane axis, and the second packet may also be configured to partially transmit and partially reflect light over the extended wavelength range for the normally incident light. The connecting may be carried out such that, at least in a first test area, the first packet exhibits a first transmission spectrum over the extended wavelength range for the normally incident light, the first transmission spectrum having a first high frequency variability $\Delta 1$, and the second packet exhibits a second transmission spectrum over the extended wavelength range for the normally incident light, the second transmission spectrum having a second high frequency variability $\Delta 2$. The combination of the first and second packets may have a first combination transmission spectrum over the extended wavelength range for the given incidence condition, the first combination transmission spectrum having a first combination high frequency variability $\Delta$comb, where $\Delta$comb may be less than at least one of $\Delta 1$ and $\Delta 2$, and is preferably less than each of $\Delta 1$ and $\Delta 2$.

Also disclosed are methods of making partially reflective multilayer optical film bodies, such methods including providing a first packet of microlayers, providing a second packet of microlayers, and connecting the first packet to the second packet to form the multilayer optical film body, where at least some light can pass through the first and second packets sequentially. The first packet may be configured to partially transmit and partially reflect light over an extended wavelength range for a given incidence condition, and the second packet may also be configured to partially transmit and partially reflect light over the extended wavelength range for the given incidence condition. The connecting may be carried out such that, at least in a first test area of the multilayer optical film body, a high frequency spectral variability of the combination of first and second packets, and/or of the film body, is less than a high frequency spectral variability of the first packet of microlayers, and preferably also less than a high frequency spectral variability of the second packet of microlayers.

Also disclosed are partially reflective multilayer optical film bodies that include a first and second packet of microlayers. The first packet of microlayers may be configured to partially transmit and partially reflect light over an extended wavelength range for a given incidence condition, and the second packet of microlayers may also be configured to partially transmit and partially reflect light over the extended wavelength range for the given incidence condition, the first and second packets being connected so that at least some light can pass through the first and second packets of microlayers sequentially. At least in a first test area of the multilayer optical film body, a high frequency spectral variability of the combination of first and second packets, and/or of the film body, may be less than a high frequency spectral variability of the first packet of microlayers, and preferably less than a high frequency spectral variability of the second packet of microlayers.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 9b is a graph showing the measured spectral transmission of the 2-packet film body of FIG. 9a, together with a graph of calculated spectral transmission based on the measured spectral transmission for the two constituent microlayer packets of FIG. 9a;

In the figures, like reference numerals designate like elements.

DETAILED DESCRIPTION OF ILLUSTRATIVE EMBODIMENTS

As mentioned above, one challenge faced by designers and manufacturers of polymeric multilayer optical films that are intended to be both (1) partially reflecting along a principal axis at normal and oblique angles and (2) broadband (i.e., intended to provide partial reflectivity over a broad wavelength range) is unintended and undesired color resulting from imperfect layer thickness control. Such undesired color is typically manifested as relatively high frequency variability in the optical transmission and reflection spectra, the high frequency variability being directly associated with deviations in the thicknesses of the microlayers (stated more accurately, deviations in the optical thicknesses of optical repeat units of microlayers) from their ideal or target values. This challenge facing manufacturers and designers of partially reflecting broadband multilayer optical films will now be explained with reference to FIGS. 1-3. For purposes of these figures, for simplicity, the multilayer optical film bodies are assumed to have no spatial variability in the plane of the film body. Thus, the spectral reflection and transmission characteristics of a given film body are assumed to be independent of the position or location on the film (e.g., the (x,y) coordinate) at which they are measured.

Figure 1:
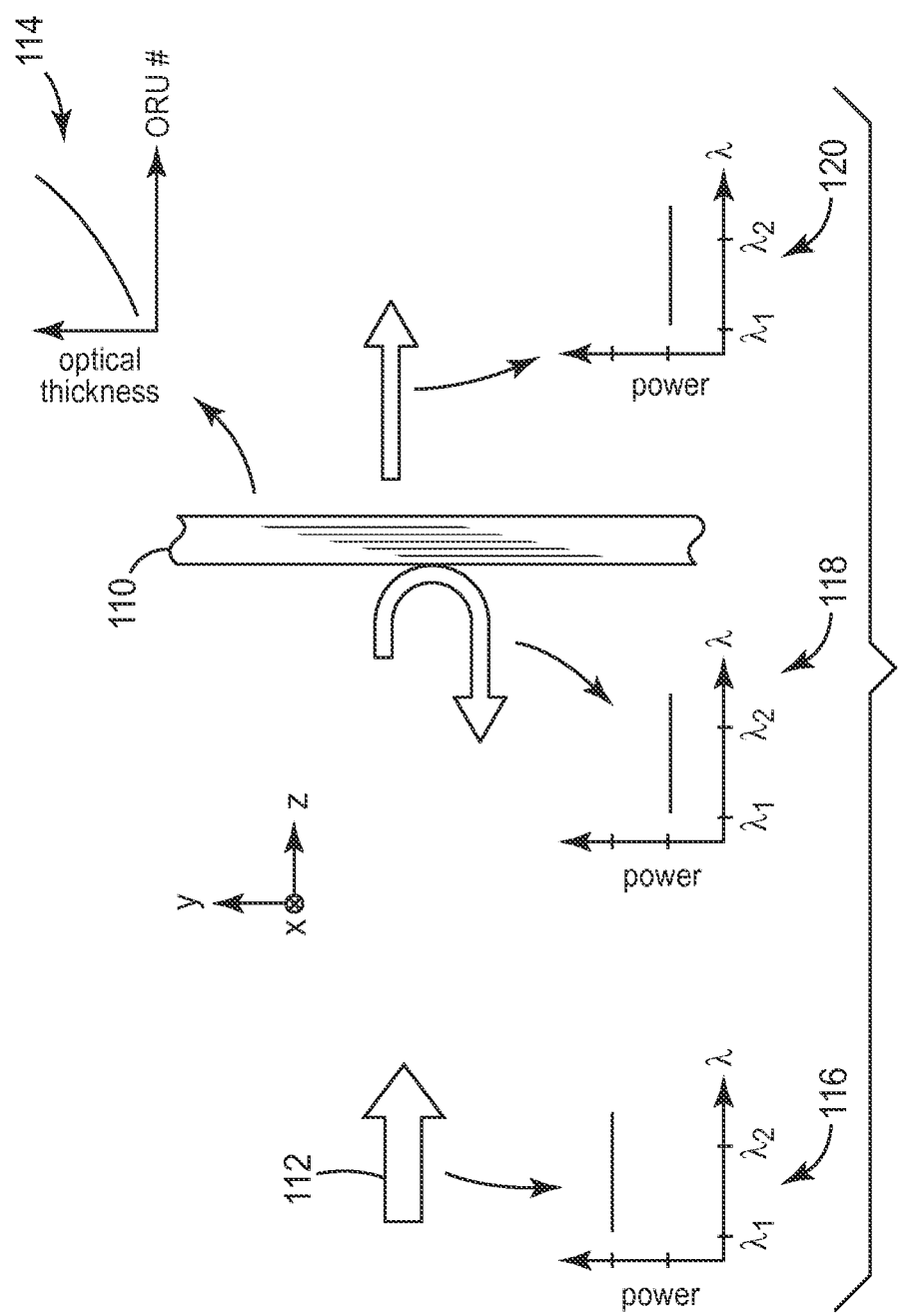
FIG. 1 is a schematic side view of an idealized single packet partially reflective broadband multilayer optical film.

In FIG. 1, a multilayer optical film body 110 is illuminated by light 112 having a particular incidence condition. For example, the light may be incident along a direction that is normal (perpendicular) to the plane of the film body, and the light may be unpolarized. Alternatively, the light may be incident along a different direction, and the light may have a different polarization characteristic, e.g., linearly polarized along a particular direction, or circularly polarized, or polarized in some other way. The reader will understand that the particular incidence condition, which may be characterized by both a direction of incidence and a polarization state, may be specified as desired by the optical film designer or manufacturer. The film body 110 is shown in the context of a Cartesian x-y-z coordinate system, and is drawn as being flat, extending parallel to the x-y plane. In general, the film body need not be flat, and if not then any sufficiently small portion of the film body may be considered to be flat in isolation. The body 110 is referred to as a "multilayer optical film body" because it is a body that includes a multilayer optical film. In some cases, the multilayer optical film may be the only component of the film body, i.e., the film body and the multilayer optical film may be identically the same. In other cases, the film body may include other components, e.g., one or more substrates, layers, coatings, films (including one or more additional multilayer optical films), or the like, to which the multilayer optical film is laminated, adhered, or otherwise attached.

Still referring to FIG. 1, the film body 110 has only one contiguous stack or packet of microlayers arranged into optical repeat units (ORUs), which are discussed further below and shown only schematically in FIG. 1. The ORUs have optical thicknesses (physical thickness multiplied by refractive index, the thickness measured along the z-direction) that change from one end of the packet to the other, such that a plot 114 of optical thickness versus the ORU number, counted from one side of the packet to the other, produces a monotonically varying thickness profile, although other desired functional shapes may also be used for the thickness profile. The thickness profile of plot 114 is assumed to be ideal, with no deviations in the optical thickness of the ORUs from their target values. Furthermore, the thickness profile, and the optical properties of the various microlayers in the packet, and the total number of microlayers (and the total number of ORUs) are assumed to be selected to provide an intermediate amount of reflectivity and an intermediate amount of transmission, for example, a reflectivity of about 0.50 (50%), over a broad wavelength range from $\lambda_1$ to $\lambda_2$, as can be ascertained from the power spectra shown in plots 116, 118, 120. Plot 116 shows power per unit wavelength as a function of wavelength for the incident light 112, indicating the incident light 112 is from an idealized broadband emitter, e.g., light from a white light source. Plot 118 shows power per unit wavelength as a function of wavelength for the portion of the incident light 112 that is reflected by the film body 110. Plot 120 shows power per unit wavelength as a function of wavelength for the portion of the incident light 112 that is transmitted by the film body 110.

The spectral reflection and transmission characteristics of the film body 110 can be readily ascertained by dividing the function in plot 118 by the function in plot 116, and by dividing the function in plot 120 by the function in plot 116, respectively. Inspection of FIG. 1 shows that such division operations will yield reflection and transmission spectra for the idealized film body 110 that are substantially constant between the limits of $\lambda_1$ and $\lambda_2$, with a constant value (and average value) of about 0.5, or 50%, for each parameter and no high frequency deviations or variability from that value as a function of wavelength.

Figure 2:
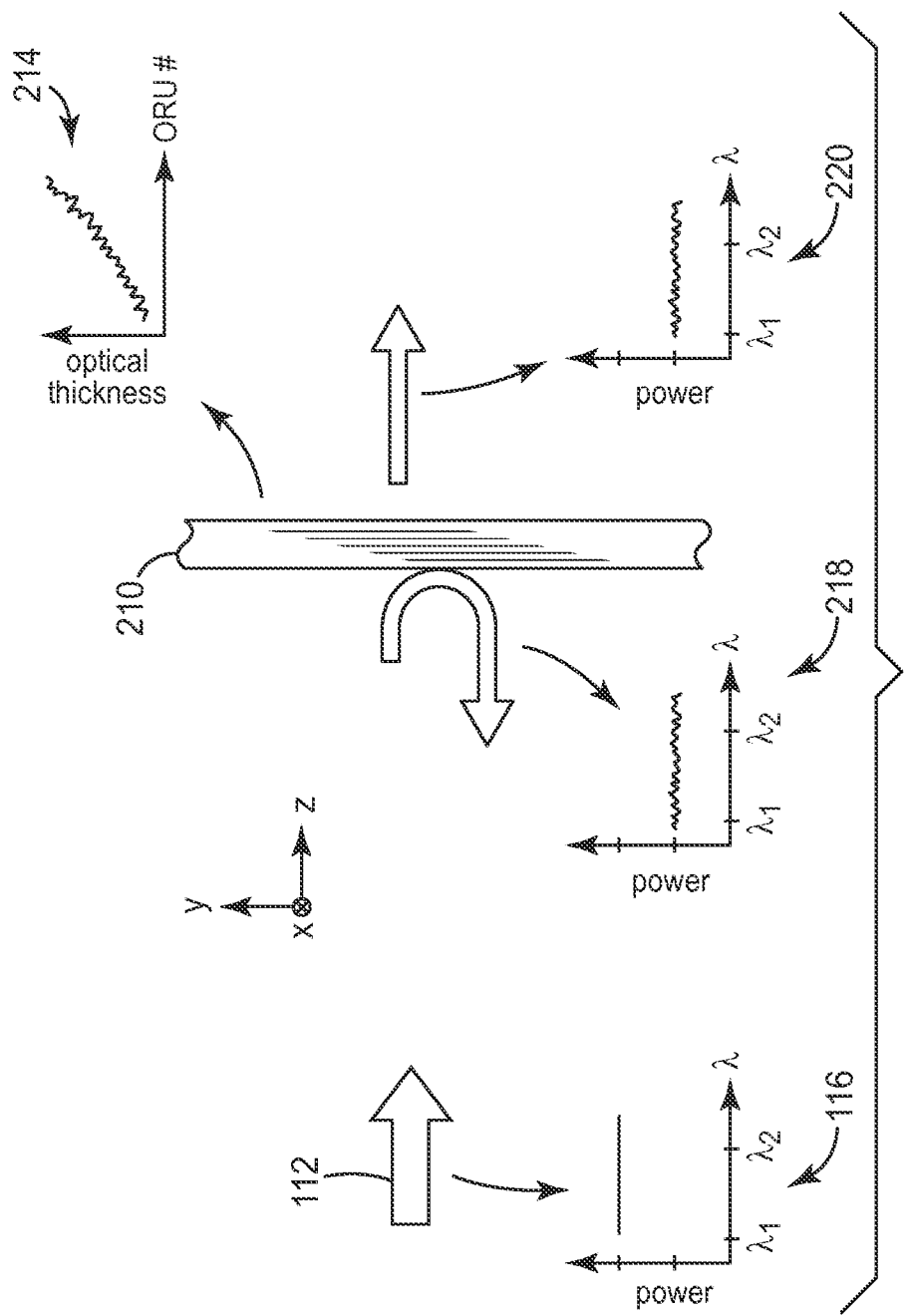
FIG. 2 is a schematic side view of a multilayer optical film similar to that of FIG. 1, but where undesired variability in the optical thickness of the optical repeat units produces undesired high frequency variability in the reflection and transmission spectra for the film.

Turning now to FIG. 2, we see there a single packet multilayer optical film body 210 similar to film body 110, but where the optical thicknesses of the ORUs in the film body 210 are shown to include deviations from their ideal or target values. Thickness deviations of microlayers or ORUs from their target values can be reduced or minimized through careful design and control of the film manufacturing process, but in practical embodiments some non-trivial thickness deviations will remain. (See, for example, the measured thickness gradient of FIG. 6, which is discussed further below.) Broadband light 112 again impinges on the film body at the particular incidence condition, and some light is reflected by the film body, while some is transmitted.

Similar to film body 110, film body 210 has a single contiguous stack or packet of microlayers arranged into ORUs, which are shown only schematically in FIG. 2. The ORUs have optical thicknesses that change from one end of the packet to the other as shown in plot 214, which plots optical thickness against the ORU number, producing a generally monotonic thickness profile. The thickness profile of plot 214 has the same general shape as that of plot 114 (FIG. 1), but the thickness profile of plot 214 is non-ideal, having significant deviations in the optical thickness of the ORUs from their target values. Such deviations may arise from a variety of factors during the manufacture of the multilayer optical film. The thickness profile, and the other relevant characteristics of the packet, are assumed to be selected to provide an intermediate amount of reflectivity and an intermediate amount of transmission, for example, a reflectivity of about 0.50 (50%), over a broad wavelength range from $\lambda_1$ to $\lambda_2$, as can be ascertained from the power spectra plotted in plots 116, 218, 220. Since like reference numerals designate like elements, plot 116 in FIG. 2 again indicates the incident light 112 is from an idealized broadband emitter, e.g., an ideal white light source. Plot 218 shows power per unit wavelength as a function of wavelength for the portion of the incident light 112 that is reflected by the film body 210. Plot 220 shows power per unit wavelength as a function of wavelength for the portion of the incident light 112 that is transmitted by the film body 210.

The spectral reflection and transmission characteristics of the film body 210 can be ascertained by dividing the function in plot 218 by the function in plot 116, and by dividing the function in plot 220 by the function in plot 116, respectively. Such division operations will yield reflection and transmission spectra for the non-idealized film body 210 that, between the limits of $\lambda_1$ and $\lambda_2$, have average values of about 0.5, or 50%, for each parameter, but that have significant high frequency deviations from that value as a function of wavelength. The variations in the reflection and transmission spectra, and in the plots of reflected and transmitted light 218, 220, are the direct result of the variations in the thickness profile of the ORUs shown in plot 214.

Variations in reflection and transmission spectra such as are depicted in plots 218, 220 may or may not be acceptable to the system designer, depending on various factors such as the amplitude of the variations, the type of light source used, the type of detector used, and whether other optical components (such as a diffuser) are present in the optical system. In at least some cases, the spectral variations may introduce an unacceptable amount of perceived color into the system.

We have developed techniques for producing multilayer optical film bodies that have a reduced amount of high frequency spectral variation in the reflection and transmission spectra, for a given variability in the thickness profile of the ORUs. These techniques generally involve arranging the microlayers into distinct multiple packets of microlayers (e.g., a first and second packet of microlayers) separated by at least one optically thick layer, where each packet of microlayers has a reflection band spanning the entire bandwidth of the intended reflector design, and then judiciously combining the multiple packets in such a way as to reduce the spectral variability. These techniques are described in more detail below. First, however, we refer to the schematic view of FIG. 3 to illustrate the technique in a generalized way.

Figure 3:
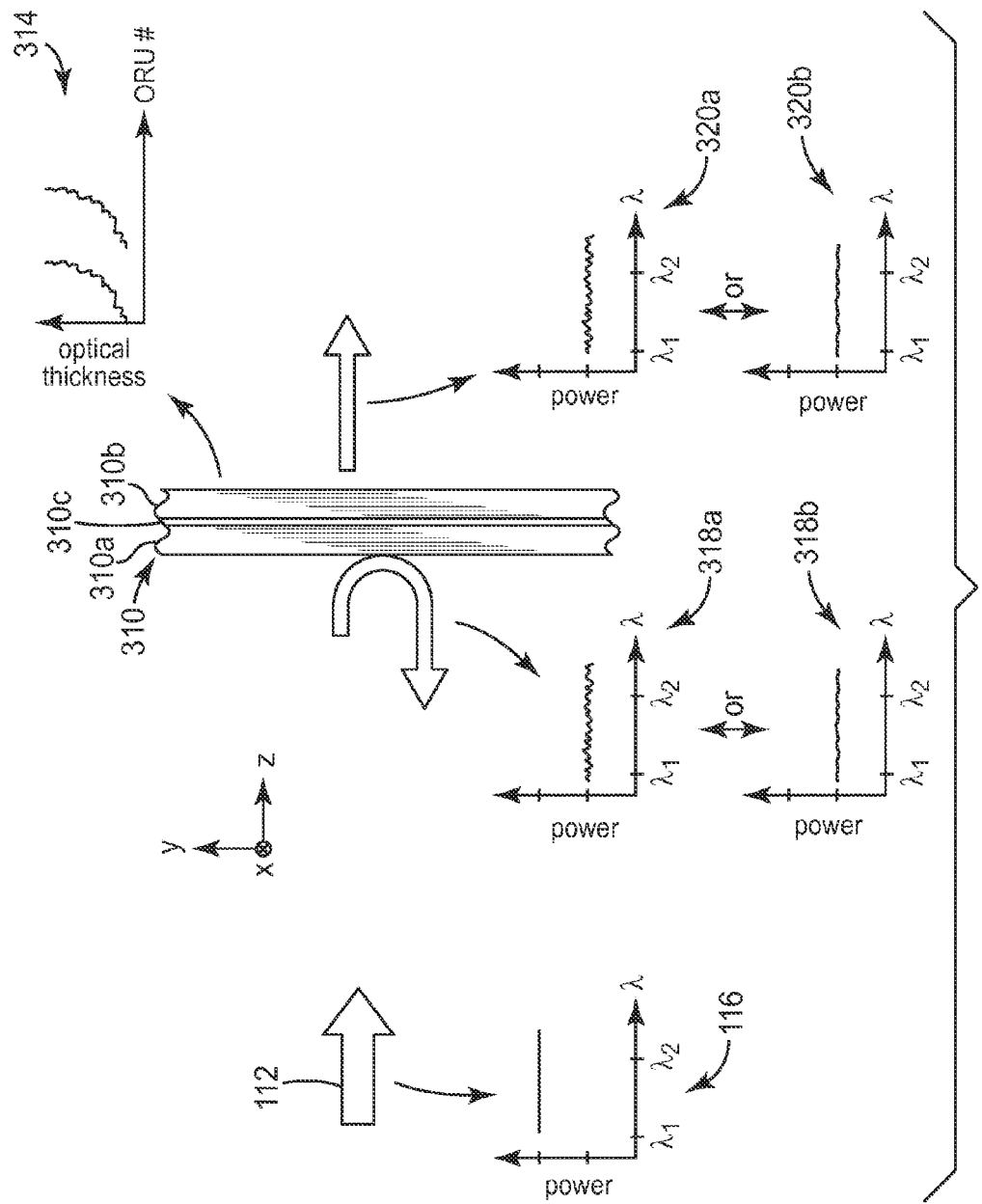
FIG. 3 is a schematic side view of a multilayer optical film similar to that of FIG. 2, but where the microlayers in the film are divided into two distinct packets.

Unlike film bodies 110 and 210, film body 310 of FIG. 3 has microlayers that are organized into two distinct stacks or packets of microlayers arranged into ORUs. The packets are shown schematically in FIG. 3 as packets 310*a* and 310*b*, and are separated by an optically thick layer 310*c*. The ORUs have optical thicknesses that change from one end of the film body to the other as shown in plot 314. Two distinct monotonic thickness profiles can be seen, corresponding to the distinct microlayer packets 310*a*, 310*b*. As shown, each of the ORU thickness profiles is non-ideal, having significant deviations in the optical thickness of the ORUs from their target values. Further, the different ORU thickness profiles substantially overlap each other in their optical thickness distributions: the minimum ORU optical thickness of the different profiles are the same or similar, and the maximum ORU optical thickness of the different profiles are also the same or similar. This causes the different packets 310*a*, 310*b* to have individual reflection bands that substantially overlap each other, e.g., having the same or similar minimum wavelength Xi, and the same or similar maximum wavelength $\lambda_2$. The reflection band of one packet may, for example, overlap at least 70%, 80%, or 90% or more of the reflection band of the other packet. The combination (but not simply the arithmetic sum) of the two individual reflection bands produces the reflection band of the film body 310.

The thickness profile, and the other relevant characteristics of the packet, are assumed to be selected to provide the film body 310 with an intermediate amount of reflectivity and an intermediate amount of transmission, for example, a reflectivity and transmission of about 0.50 (50%), over a broad wavelength range from $\lambda_1$ to $\lambda_2$, as can be ascertained from the power spectra plotted in plots 116, 218, 220. Since like reference numerals designate like elements, plot 116 in FIG. 2 again indicates the incident light 112 is from an idealized broadband emitter, e.g., an ideal white light source.

FIG. 3 schematically depicts two different ways in which the packets 310*a*, 310*b* could be combined. In a first way, peaks and valleys from high frequency spectral variations in the reflection (or transmission) spectrum of one packet could align themselves with peaks and valleys, respectively, from high frequency spectral variations in the reflection (or transmission) spectrum of the other packet. One way this could be accomplished is by fabricating packets 310*a*, 310*b* to be substantially identical, with substantially identical reflection and transmission spectra whose high frequency spectral variations—i.e., the various peaks and valleys thereof—are substantially coincident with each other in wavelength. This first way of combining the packets 310*a*, 310*b* produces reflected light for the film body 310 whose power per unit wavelength as a function of wavelength is shown in plot 318*a*, and transmitted light whose power per unit wavelength as a function of wavelength is shown in plot 320*a*. The plots 318*a*, 320*a* are shown to have a substantial amount of high frequency spectral variability, because the reflection and transmission spectra of the film body 310 would include such high frequency variability as a result of the substantial alignment of the peaks and valleys associated with the individual packets 310*a*, 310*b*.

In a second way of combining the packets 310*a*, 310*b*, peaks and valleys from high frequency spectral variations in the reflection (or transmission) spectrum of one packet could be substantially misaligned with peaks and valleys, respectively, from high frequency spectral variations in the reflection (or transmission) spectrum of the other packet. One way this could be accomplished is by initially fabricating packets 310*a*, 310*b* to be substantially identical, with substantially identical reflection and transmission spectra whose high frequency spectral variations are substantially coincident with each other in wavelength—but then carrying out the additional step of thinning or thickening one of the packets during production very slightly with respect to the other to shift the reflection and transmission spectra of one of the packets so that the high frequency spectral peaks of one packet are substantially misaligned with those of the other packet, and the high frequency spectral valleys of one packet are substantially misaligned with those of the other packet. This second way of combining the packets 310*a*, 310*b* produces reflected light for the film body 310 whose power per unit wavelength as a function of wavelength is shown schematically in plot 318*b*, and transmitted light whose power per unit wavelength as a function of wavelength is shown schematically in plot 320*b*. The plots 318*b*, 320*b* are shown to have a substantially reduced amount of high frequency spectral variability, because the reflection and transmission spectra of the film body 310 would include such reduced high frequency variability as a result of the substantial misalignment of the peaks and valleys associated with the individual packets 310*a*, 310*b*.

Figure 4:
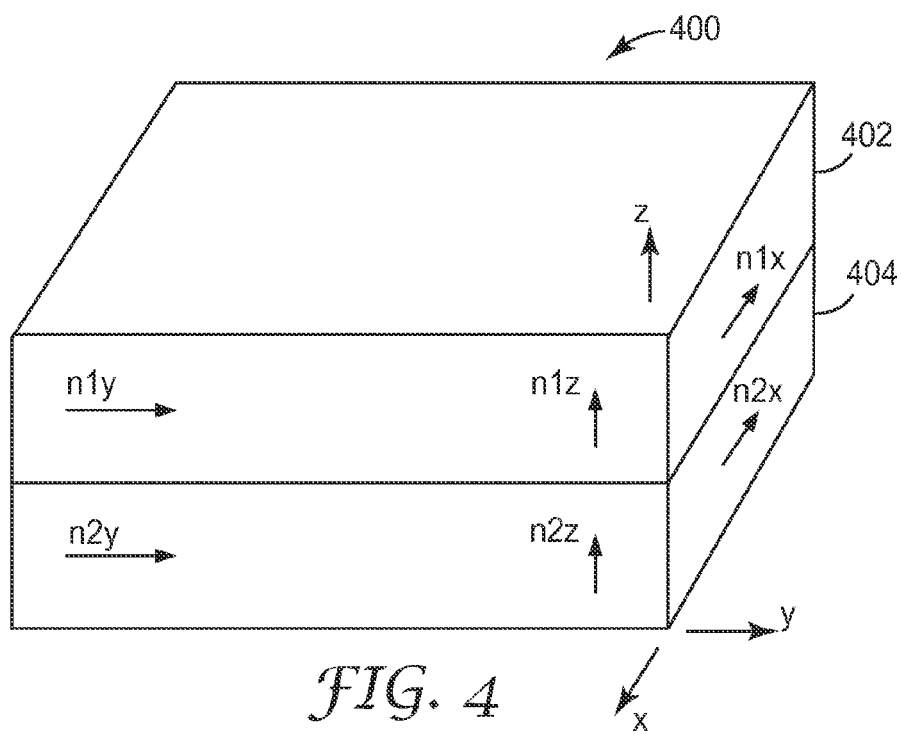
FIG. 4 is a schematic perspective view of an exemplary optical repeat unit (ORU) of a multilayer optical film.
Figure 5:
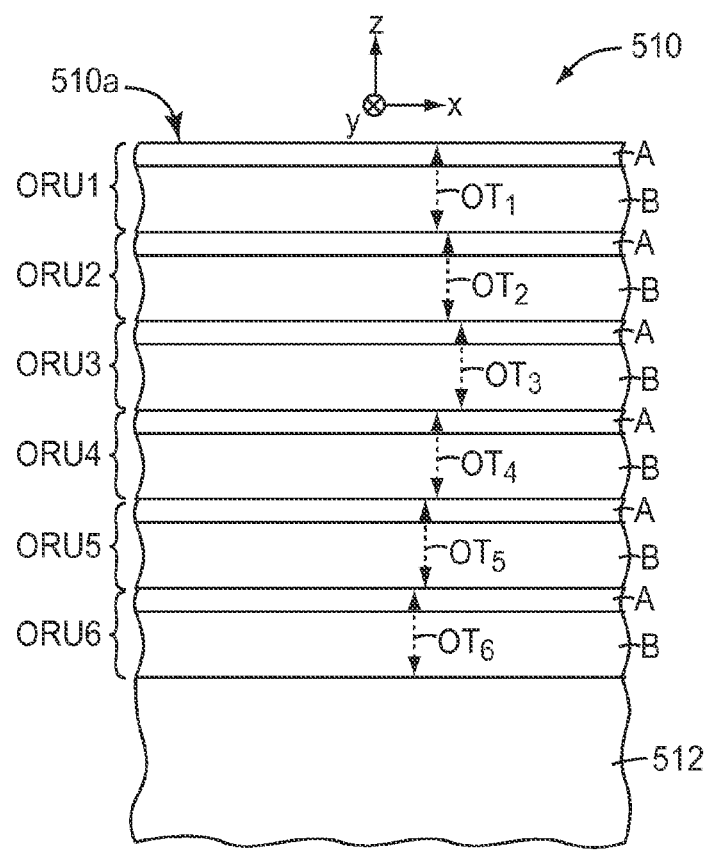
FIG. 5 is a schematic perspective view of a portion of a multilayer optical film, this view showing a packet of microlayers and a plurality of ORUs.

Having now discussed aspects of the invention in broad terms, and before discussing those and other aspects in further detail, we turn to FIGS. 4 and 5 for a brief review of microlayers, optical repeat units (ORUs), stacks of microlayers, and multilayer optical films and film bodies.

FIG. 4 depicts only two layers of a multilayer optical film 400, which would typically include tens or hundreds of such layers arranged in one or more contiguous packets or stacks. The film 400 includes individual microlayers 402, 404, where "microlayers" refer to layers that are sufficiently thin so that light reflected at a plurality of interfaces between such layers undergoes constructive or destructive interference to give the multilayer optical film the desired reflective or transmissive properties. The microlayers 402, 404 may together represent one optical repeat unit (ORU) of the multilayer stack, an ORU being the smallest set of layers that recur in a repeating pattern throughout the thickness of the stack. Alternative ORU designs are discussed further below. The microlayers have different refractive index characteristics so that some light is reflected at interfaces between adjacent microlayers. For optical films designed to reflect light at ultraviolet, visible, or near-infrared wavelengths, each microlayer typically has an optical thickness (i.e., a physical thickness multiplied by refractive index) of less than about 1 μm. Thicker layers can, however, also be included, such as skin layers at the outer surfaces of the film, or protective boundary layers disposed within the film that separate packets of microlayers.

We may refer to the refractive indices of one of the microlayers (e.g. layer 402 of FIG. 4, or the "A" layers of FIG. 5 below) for light polarized along principal x-, y-, and z-axes as n1x, n1y, and n1z, respectively. The mutually orthogonal x-, y-, and z-axes may, for example, correspond to the principal directions of the dielectric tensor of the material. Typically, and for discussion purposes, the principle directions of the different materials are coincident, but this need not be the case in general. We refer to the refractive indices of the adjacent microlayer (e.g. layer 404 in FIG. 4, or the "B" layers in FIG. 5) along the same axes as n2x, n2y, n2z, respectively. We refer to the differences in refractive index between these layers as $\Delta nx$ (=n1x−n2x) along the x-direction, $\Delta ny$ (=n1y−n2y) along the y-direction, and $\Delta nz$ (=n1z−n2z) along the z-direction. The nature of these refractive index differences, in combination with the number of microlayers in the film (or in a given stack of the film) and their thickness distribution, controls the reflective and transmissive characteristics of the film (or of the given stack of the film). For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. A reflective polarizer may be considered to be an optical body that strongly reflects normally incident light that is polarized along one in-plane axis, referred to as the "block axis", if the wavelength is within the reflection band of the packet, and strongly transmits such light that is polarized along an orthogonal in-plane axis, referred to as the "pass axis".

If desired, the refractive index difference ($\Delta n_z$) between adjacent microlayers for light polarized along the z-axis can also be tailored to achieve desirable reflectivity properties for the p-polarization component of obliquely incident light. To maintain near on-axis reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 \ast \Delta n_x$. Alternatively, $\Delta n_z \leq 0.25 \ast \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e., $\Delta n_z < 0$. This condition yields interfaces whose reflectivity for p-polarized light increases with increasing angles of incidence, as is the case for s-polarized light. If $\Delta n_z > 0$, then the reflectivity for p-polarized light decreases with angle of incidence. The foregoing relationships also of course apply to relationships involving $\Delta n_z$ and $\Delta n_y$, e.g., in cases where significant reflectivity and transmission are desired along two principal in-plane axes (such as a balanced or symmetric partially reflecting mirror film, or a partial polarizing film whose pass axis has significant reflectivity at normal incidence).

In the schematic side view of FIG. 5, more interior layers of a multilayer film 510 are shown so that multiple ORUs can be seen. The film is shown in relation to a local x-y-z Cartesian coordinate system, where the film extends parallel to the x- and y-axes, and the z-axis is perpendicular to the film and its constituent layers and parallel to a thickness axis of the film.

In FIG. 5, the microlayers are labeled "A" or "B", the "A" layers being composed of one material and the "B" layers being composed of a different material, these layers being stacked in an alternating arrangement to form optical repeat units or unit cells ORU 1, ORU 2, . . . ORU 6 as shown. Typically, a multilayer optical film composed entirely of polymeric materials would include many more than 6 optical repeat units if high reflectivities are desired. The multilayer optical film 510 is shown as having a substantially thicker layer 512, which may represent an outer skin layer, or a protective boundary layer ("PBL", see U.S. Pat. No. 6,783, 349 (Neavin et al.)) that separates the stack of microlayers shown in the figure from another stack or packet of microlayers (not shown). If desired, two or more separate multilayer optical films can be laminated together, e.g. with one or more thick adhesive layers, or using pressure, heat, or other methods to form a laminate or composite film.

In some cases, the microlayers can have thicknesses and refractive index values corresponding to a ¼-wave stack, i.e., arranged in ORUs each having two adjacent microlayers of equal optical thickness (f-ratio=50%, the f-ratio being the ratio of the optical thickness of a constituent layer "A" to the optical thickness of the complete optical repeat unit), such ORU being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. For purposes of the present application, we contemplate multilayer optical films whose f-ratio may be any suitable value, and do not limit ourselves to films whose f-ratio of 50%. Accordingly, in the embodiment of FIG. 5, the "A" layers are depicted for generality as being thinner than the "B" layers. Each depicted optical repeat unit (ORU 1, ORU 2, etc.) has an optical thickness ($OT_1$, $OT_2$, etc.) equal to the sum of the optical thicknesses of its constituent "A" and "B" layer, and each optical repeat unit reflects light whose wavelength λ is twice its overall optical thickness.

In exemplary embodiments, the optical thicknesses of the ORUs differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Alternatively, the layer thickness gradient of the disclosed packets of microlayers may be deliberately tailored to provide reflection and transmission spectra that change significantly over the wavelength range of interest. For example, it may be desirable for the multilayer optical film body to transmit (or reflect) more blue light than red light, or vice versa, or to transmit (or reflect) more green light than blue light and red light. Although such desired spectral non-uniformities may cause the multilayer optical film body to exhibit a colored (non-clear or non-neutral) appearance, this desired color is typically distinguishable from the undesired color discussed elsewhere herein in that the desired color is associated with relatively slow changes in the spectral reflection or transmission, whereas the undesired color is associated with faster changes in those parameters. For example, spectral non-uniformities in reflection or transmission associated with desired color may vary as a function of wavelength with characteristic periods of about 100 nm or greater, whereas spectral non-uniformities in reflection or transmission associated with undesired color may vary as a function of wavelength with characteristic periods of less than about 50 nm.

To achieve high reflectivities with a reasonable number of layers, adjacent microlayers may exhibit a difference in refractive index ($\Delta nx$) for light polarized along the x-axis of at least 0.05, for example. If high reflectivity is desired for two orthogonal polarizations, then the adjacent microlayers also may exhibit a difference in refractive index ($\Delta ny$) for light polarized along the y-axis of at least 0.05, for example. In some cases, adjacent microlayers may have refractive index mismatches along the two principal in-plane axes ($\Delta nx$ and $\Delta ny$) that are close in magnitude, in which case the film or packet may behave as an on-axis mirror or partial mirror. Alternatively, for reflective polarizers that are designed to be partially reflective for the pass axis polarization, adjacent microlayers may exhibit a large difference in refractive index ($\Delta nx$) for light polarized along the x-axis and a smaller but still substantial difference in refractive index ($\Delta ny$) for light polarized along the y-axis. In variations of such embodiments, the adjacent microlayers may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle.

Although the examples herein describe reflectors whose reflectivity increases with angle of incidence, partial reflectors whose reflectivity along a given principal axis decreases with angle of incidence can be made with reduced color using the same techniques described herein. This is particularly important for films whose reflectivity is large at normal incidence and are viewed in transmitted light at various angles, including normal incidence.

At least some of the microlayers in at least one packet of the disclosed multilayer optical films may if desired be birefringent, e.g., uniaxially birefringent or biaxially birefringent, although in some embodiments, microlayers that are all isotropic may also be used. In some cases, each ORU may include one birefringent microlayer, and a second microlayer that is either isotropic or that has a small amount of birefringence relative to the other microlayer. In alternative cases, each ORU may include two birefringent microlayers.

Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", U.S. Pat. No. 6,783,349 (Neavin et al.) "Apparatus for Making Multilayer Optical Films", and U.S. Patent Application 61/332,401 entitled "Feedblock for Manufacturing Multilayer Polymeric Films", filed May 7, 2010. The multilayer optical film may be formed by coextrusion of the polymers as described in any of the aforementioned references. The polymers of the various layers may be chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic. A multilayer optical film with controlled low frequency variations in reflectivity and transmission over a wide wavelength range can be achieved by the thermal zone control of the axial rod heater, see e.g. U.S. Pat. No. 6,783,349 (Neavin et al.).

In some cases, the fabrication equipment may employ one or more layer multipliers to multiply the number of layers in the finished film. In other embodiments, the films can be manufactured without the use of any layer multipliers. Although layer multipliers greatly simplify the generation of a large number of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile, for low transmitted and reflected color, can be difficult to make using multi-packet films manufactured using multipliers. If the number of layers in a single packet generated directly in a feedblock do not provide sufficient reflectivity, then two or more such films can be attached to increase the reflectivity. Further discussion of layer thickness control, so as to provide smooth spectral reflectivity and transmission for low color films, is provided in PCT publication WO 2008/144656 (Weber et al.).

If the optical thicknesses of all of the microlayers in a given multilayer film were designed to be the same, the film would provide high reflectivity over only a narrow band of wavelengths. Such a film would appear highly colored if the band were located somewhere in the visible spectrum, and the color would change as a function of angle. In the context of display and lighting applications, films that exhibit noticeable colors are generally avoided, although in some cases it may be beneficial for a given optical film to introduce a small amount of color to correct for color imbalances elsewhere in the system. Exemplary multilayer optical film bodies are provided with broad band reflectivity and transmission, e.g. over the entire visible spectrum, by tailoring the microlayers—or more precisely, the optical repeat units (ORUs), which in many (but not all) embodiments correspond to pairs of adjacent microlayers—to have a range of optical thicknesses. Typically, the microlayers are arranged along the z-axis or thickness direction of the film from a thinnest ORU on one side of the film or packet to a thickest ORU on the other side, with the thinnest ORU reflecting the shortest wavelengths in the reflection band and the thickest ORU reflecting the longest wavelengths.

After the multilayer web is cooled on the chill roll, it can be drawn or stretched to produce a finished or near-finished multilayer optical film. The drawing or stretching accomplishes two goals: it thins the layers to their desired final thicknesses, and it may orient the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

Figure 6:
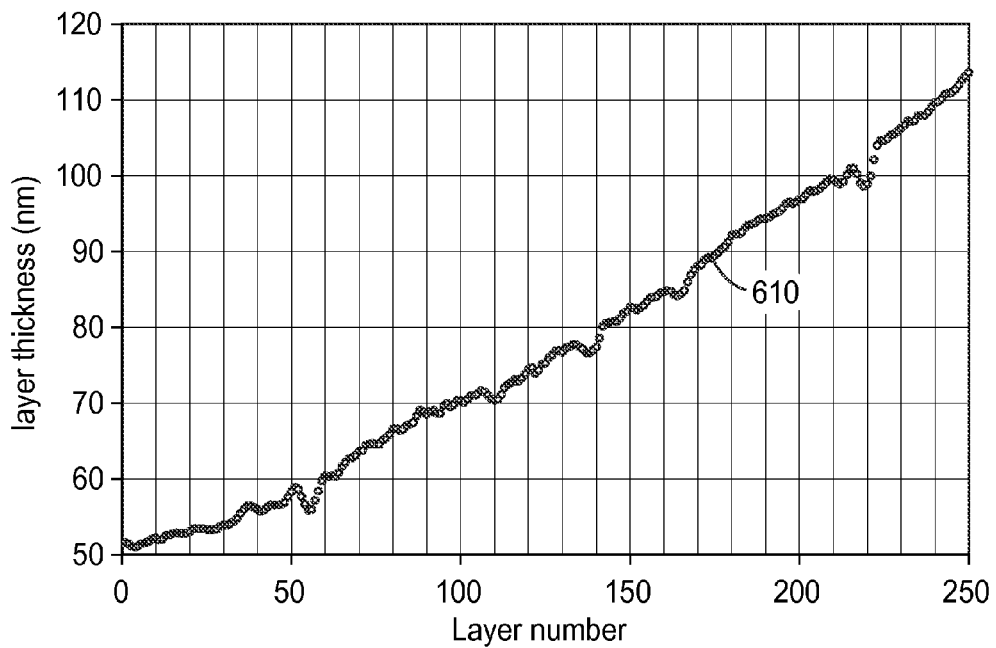
FIG. 6 is a graph of a portion of a measured thickness profile of an actual multilayer optical film.

FIG. 6 is a graph of a portion of the measured thickness profile 610 of a multilayer optical film that was manufactured, using the foregoing coextrusion and stretching processes, to have a single packet of 275 microlayers. The microlayers were arranged in a quarter-wave stack with alternating A, B polymer materials, thus providing 137 ORUs in the stack. For the layer thickness values that are shown in the figure, a point in the profile 610 is plotted for the physical (not optical) thickness of each microlayer, the microlayers being numbered from 1 to 250 from one end of the packet to the other. The resulting profile 610 is nominally monotonic so as to provide a wide reflection band from about 350 to 750 nm for normally incident light, but thickness variations relative to an ideal smooth curve can be readily seen. These thickness variations exemplify the type of thickness variations that may be observed in the ORUs of coextruded multilayer optical films. Such uncontrolled, typically random or quasi-random thickness variations in the ORUs of the packet give rise to undesired high frequency variations in the transmission spectrum and reflection spectrum of the film.

Layer profile disruptions or variations such as those shown in FIG. 6 may be difficult to eliminate by advanced manufacturing techniques, and furthermore may not be the same at all positions, points, or areas of the film. Thus, in at least some circumstances it may be possible to substantially eliminate the thickness variations only for certain portions of the film (which may be manufactured in the form of a long continuous web, for example), while other portions of the web exhibit substantial variations in the ORU thickness profile. The disruptions in the layer thickness profile limit the flatness or uniformity of the transmission and reflection spectra on a small wavelength scale (corresponding to high frequency spectral variations), such as within any given 50 nm portion of a broadband reflector that extends, e.g., across the visible spectrum. It can be difficult to provide localized heating or cooling of the feedblock metal that would be necessary to smooth out these variations or kinks in the layer profile. We have observed that variations or kinks such as this may not appear in a coextruded multilayer optical film reproducibly from run-to-run, and may be more predominant in the center of the web than near the edges, or vice versa.

The multilayer optical films and film bodies can also include additional layers and coatings selected for their optical, mechanical, and/or chemical properties. For example, a UV absorbing layer can be added at one or both major outer surfaces of the film to protect the film from long-term degradation caused by UV light. Additional layers and coatings can also include scratch resistant layers, tear resistant layers, and stiffening agents, for example. See, e.g., U.S. Pat. No. 6,368,699 (Gilbert et al.).

The materials used in the manufacture of multilayer optical films are typically polymer materials that have very low absorption at least over visible and near-visible wavelengths and for typical optical path distances within the film. Thus, the percent reflection R and the percent transmission T of a multilayer film for a given light ray are typically substantially complementary, i.e., $R+T \approx 1$ (or 100%), usually within an accuracy of about 0.01 (1%). Thus, unless otherwise noted, a multilayer optical film disclosed herein as having a certain reflectivity R can be assumed to have a complementary transmission ($T=1-R$), and vice versa, and reported values of reflectivity or transmission can be assumed to also report on transmission or reflectivity, respectively, via the relationship $R+T \approx 1$ (or 100%).

The reflection and transmission characteristics can be readily determined whether one is dealing with a computer-modeled optical film or an actual film whose properties are measured in the laboratory. The reflection spectrum and all of its features such as the reflectivity at any angle and the band edges for birefringent multilayer films can be calculated using the 4×4 stack code of Berremen and Scheffer, Phys. Rev. Lett. 25, 577 (1970). A description of this method is given in the book "Ellipsometry and Polarized Light" written by Azzam and Bashara, published by Elsevier Science, Holland.

Multilayer optical films disclosed herein preferably exhibit an intermediate amount of reflectivity, i.e., partial reflection and partial transmission, over an extended band for one or more specified incidence conditions. The partial reflection and partial transmission provided by the microlayers over the extended band, e.g., the visible wavelength range in the case of many display and lighting applications, makes the films susceptible to introducing undesirable color into the system if the reflection or transmission characteristic is not sufficiently uniform or smooth as a function of wavelength. Depending on the system design of which the multilayer optical film is a part, the intermediate reflectivity/transmission may be designed to occur for any desired incidence condition. In one case, for example, the incidence condition may be for normally incident light that is unpolarized. In another case, the incidence condition may be for normally incident light polarized along a block axis or a pass axis of the film. In other cases, the incidence condition may be for light incident obliquely in any selected plane of incidence, which light may be s-polarized, p-polarized, or a combination thereof.

We now pause to discuss the issue of the perceived "color" associated with high frequency spectral variations in reflection or transmission of a partially reflective multilayer optical film or film body, and how one may characterize such spectral variations for purposes of the present application.

Color can be measured in many different ways for a given multilayer optical film body, or for a microlayer packet thereof. In practice, the color depends on many factors, including the spectral features of the particular light source used in the system, whether the film is viewed in reflection or transmission, the angle of incidence of the light, and the specific caliper of the film stack. Therefore, instead of calculating or measuring specific color metrics for all possible light sources at all possible angles and film calipers, we have found that, for purposes of the present application, it is better to characterize or describe the source of undesirable color in the multilayer film in a way that is independent of the light source or detector. The source of undesirable color is the multiple narrow or abrupt features in the film's transmission and/or reflection spectrum that cannot be removed with known process or hardware changes. These spectral features are the small, relatively high frequency variations in transmission values that typically occur as 10 nm, 50 nm, or 100 nm wide peaks and valleys in an otherwise smooth spectrum over the wavelength range of interest. These high frequency variations can give rise to perceivable hues of iridescent colors in the film in many specific system applications.

An exemplary way to describe the undesired color-producing potential of a broad band partially reflecting film is to characterize the non-uniformity or lack of smoothness of the transmission or reflection spectrum of the film for the specified or desired incidence condition. A simple and reliable measure of spectral non-uniformity or variability is the deviation of the spectrum from a smooth spectral target. This can be done, for example, by taking the difference between a measured (or modeled) spectrum and a smoothed version of the spectrum. The smoothed version of the spectrum is preferably more complex than, for example, a single number equal to the average value of the spectrum averaged over the wavelength range of interest. It is desirable for the smoothed version of the spectrum to also include, or to take into account, slowly varying spectral features that the film designer may want the film to exhibit, and that the film manufacturer can incorporate into the film by appropriate control of an axial rod heater (in the case of coextruded multilayer polymer films) or the like. We have found that, when dealing with multilayer optical film bodies, or microlayer packets thereof, designed for operation throughout the visible wavelength range, or where the wavelength range of interest spans the visible wavelength region and the near infrared region up to 800, 900, or 1000 nm, for example, the smoothed version of the spectrum is preferably a curve fit to the actual spectrum, where the curve fit includes only polynomials up to $3^{rd}$ order in wavelength. Thus, the smoothed version of the transmission or reflection spectrum of a film body or packet thereof may be a best-fit curve to the actual spectrum over the wavelength range of interest, where the best-fit curve is of the form $a_0 + a_1\lambda + a_2\lambda^2 + a_3\lambda^3$. The high frequency spectral variability or non-uniformity, which is the source of the undesirable color in the multilayer optical film body or packet, may then be computed by first taking the difference between the actual spectrum and the smoothed version (the best-fit curve), and then calculating the standard deviation of this difference curve. The standard deviation, or a similar statistical quantity, of such a difference curve can be readily calculated and then used as a measure of the high frequency variability of the transmission or reflection spectrum associated with the undesirable color potential of the film or packet.

Controlling color in extruded multilayer films involves controlling the extrusion and orientation processes by which the film is made. Techniques disclosed herein for reducing undesirable high frequency color may involve controlling the process to make two or more separate multilayer film stacks and then laminating them together such that at least some light can pass sequentially through both film stacks. It is often desirable not only to provide the film body, and individual microlayer packets thereof, with a uniform or smoothly varying spectral transmission or reflection over the wavelength range of interest, but also to provide the film body and packets thereof with good spatial uniformity, such that the same or similar spectral transmission and reflection is maintained at substantially all possible test points or areas across the active area of the film body or packets. Processes for achieving good spatial uniformity over the active area of a multilayer polymeric optical film are discussed in U.S. Pat. No. 6,531,230 (Weber et al.), "Color Shifting Film". Although the '230 patent emphasizes spatial uniformity in multilayer films with abrupt changes in reflection or transmission as a function of wavelength, such that noticeable "color shifts" can be seen with changing incidence angle, whereas multilayer films of interest to the present application are typically broadband with desirably lower perceived color (e.g. a transmission spectrum that is substantially flat over the wavelength range of interest, or possibly having a moderate slope or curvature over the range of interest), the teachings of the '230 patent with regard to spatial uniformity are still pertinent to the multilayer films of interest here. Small variations in transmission or reflection which are exhibited as peaks and valleys in an otherwise smooth spectrum behave similar to the sharp band edges recited in the '230 patent. Just as with the sharp band edges, the small variations in transmission or reflection are more noticeable if the film body (or its constituent microlayer packets) is non-uniform in thickness caliper, since the wavelength position of a spectral feature is closely correlated with the thickness or caliper of the film.

As mentioned above, we have found it feasible to reduce the undesired color of partially transmissive multilayer optical film bodies by utilizing at least two packets of microlayers, each with reflection spectra for a given incidence condition covering the same or similar broadband spectral range, and then laminating or otherwise combining the microlayer packets such that the high frequency spectral peaks and valleys of one packet tend to cancel the high frequency spectral peaks and valleys of the other packet, resulting in a smoother reflection and transmission spectrum for the resultant partially transmissive multilayer optical film body. Spectral peaks of one packet can be aligned with spectral valleys (and misaligned with the spectral peaks) of the other packet by making relatively spatially uniform microlayer packets (e.g. as distinct films) and making one with a desired caliper difference from the other. If all of the spectral peaks and valleys of a first packet or film do not correspond in a one-to-one fashion with those of a second packet or film, then one can choose the most offending spectral peak or valley in one packet and align it with an appropriate offsetting feature in the second packet to reduce the color in the final product.

The disclosed spectral smoothing techniques rely in part on the alignment (including partial alignment) of spectral peaks of one broadband microlayer packet with spectral valleys of another broadband microlayer packet to produce a smoother transmission and reflection spectrum in the combined or finished partially transmissive broadband product. An unexpected discovery was that when the high frequency peaks and valleys of one packet do not cancel with those of the other packet, or even if the packets are combined such that the high frequency peaks and valleys of one packet reinforce those of the other packet, the color of the combined article is not much greater than either one of the single packets or films alone. Thus, for example, we found that even where spatial non-uniformities in two microlayer packets are such that the high frequency peaks and valleys of one packet can be made to cancel those of the other packet only at one or more selected points or target areas on the active area of the combined article, while at other points or target areas the high frequency peaks and valleys of one packet do not cancel and may in fact be reinforced by those of the other packet, the resulting combined article may nevertheless exhibit, overall, a reduced high frequency color compared to a similar article made with only a single microlayer packet.

The unexpected color characteristics of the multiple packet multilayer optical film bodies are in part due to the fact that the reflectivities of the constituent microlayer packets of the film body do not add linearly or coherently, but are combined incoherently according to the so-called "pile-of-plates" formula for the combined reflectivity of two reflectors R1 and R2:

$$R = \frac{R1 + R2 * (1 - 2R1)}{1 - R1 * R2} \qquad \text{Equation (1)}$$

In this equation, R1 and R2 are the reflectivities of the individual microlayer packets, and R is the reflectivity of the overall article (film body), which contains both packets. If R1 and R2 are internal reflectivities, then R is the internal reflectivity of the film body. Alternatively, R1 and R2 may collectively incorporate the effects of two air/polymer interfaces (e.g. R1 may include the effect of one air/polymer interface, and R2 may include the effect of another such interface), whereupon R would represent the external reflectivity of the film body. The packets are assumed to be separated by an optically thick medium, i.e., one that is large compared to the wavelength of light of interest. Note that Equation (1) has no wavelength dependence, but the reader will understand that the equation can be evaluated at any given wavelength of interest. That is, the parameters R, R1, and R2 represent the reflectivities of the film body, the first microlayer packet, and the second microlayer packet, respectively, all measured at a particular wavelength of interest.

Preferably, the reflectivities R1, R2 of the microlayer packets (or their average reflectivities over the wavelength range of interest) are the same or similar (for example, within a factor of 2), or at least are of about the same order of magnitude. For example, combining a 5% reflective microlayer packet with an 80% reflective microlayer packet does little to increase the reflectivity of the film body beyond 80%. Furthermore, the bandwidth of the respective reflection bands for the microlayer packets are also preferably the same or similar. The bandwidths and band edges of the packets may be somewhat different, but the reflection bands of the packets preferably extend over a common broad band, e.g., at least the visible spectrum or a major portion thereof.

Preferably, interference effects of air-polymer interfaces (or interfaces involving air and some other light transmissive optical material) are substantially avoided in the multilayer optical film body so as to keep undesirable high frequency oscillations in the transmission and reflection spectra to a minimum. For example, other than an air-polymer interface at a front and back major surface of the film body, the film body may include no other significant air-polymer interfaces. By incorporating protective boundary layers (PBLs), skin layers, and/or other optically thick layers or substrates, the film body in exemplary embodiments may have an overall physical thickness of at least 100 micrometers to substantially reduce high frequency oscillations in the visible portion of the spectrum, and at least 200 micrometers to further reduce the high frequency oscillations in the near infrared portion of the spectrum. In exemplary embodiments, the first and second microlayer packets are connected by one or more optically thick layers of light-transmissive material of the same or similar refractive index as the materials used in the microlayer packets, with no air gaps between the packets.

Figure 7A:
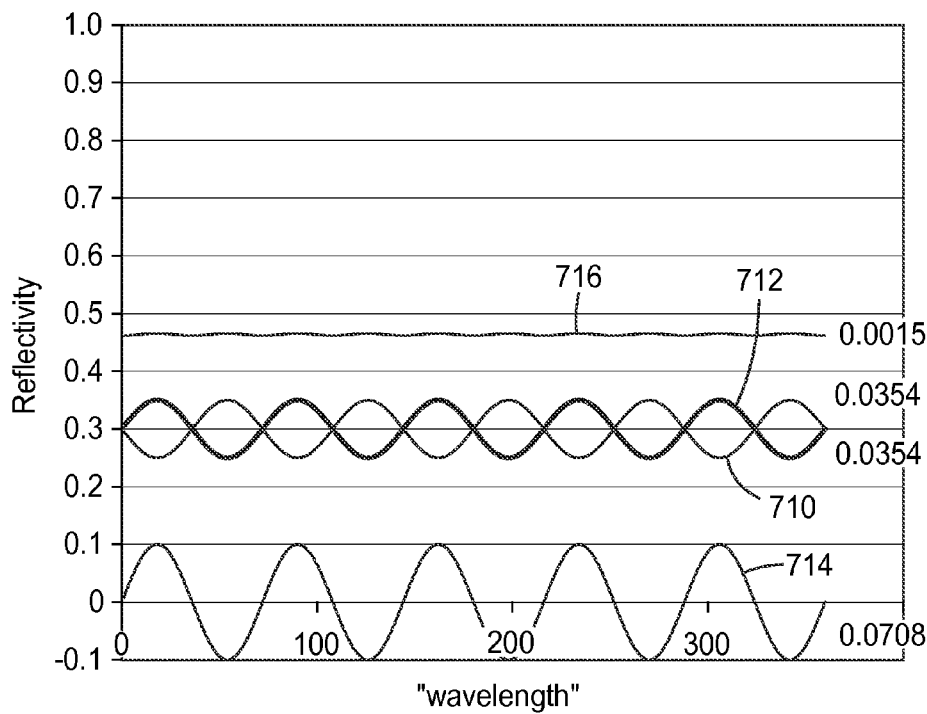
FIG. 7a is a plot of spectral reflectivity for two hypothetical microlayer packets, the figure also showing a difference spectrum between the two microlayer spectral reflectivities, and a combination spectrum that results when the two hypothetical packets are incorporated into a hypothetical 2-packet multilayer optical film body.
Figure 7B:
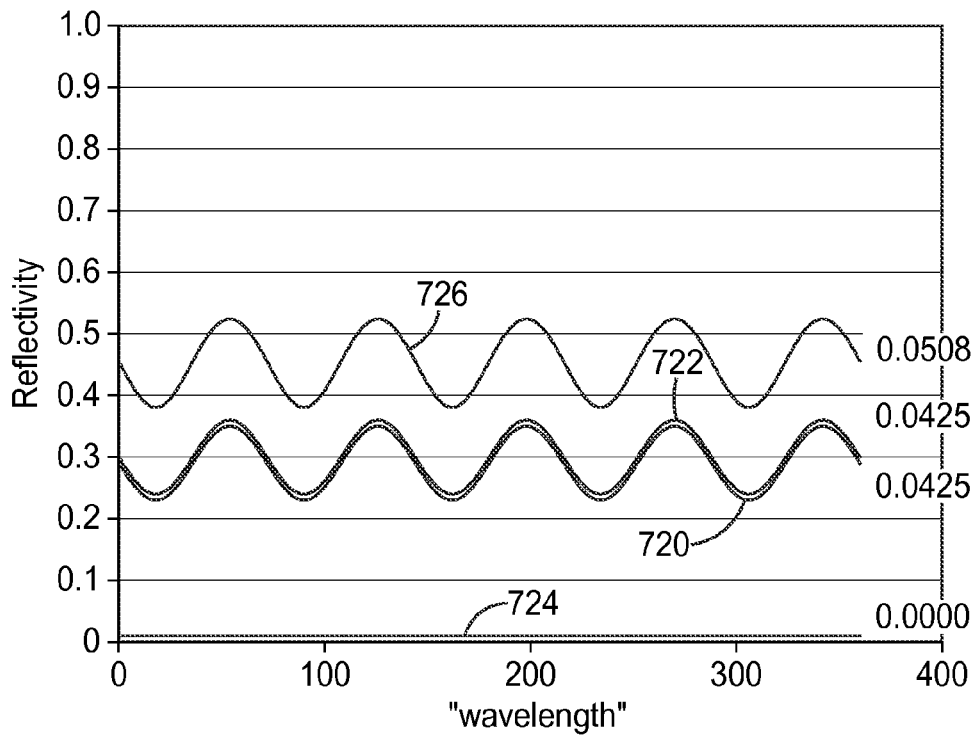
FIGS. 7b and 7c are plots similar to FIG. 7a, but where the spectral reflectivity of one of the microlayer packets is shifted in wavelength.
Figure 7C:
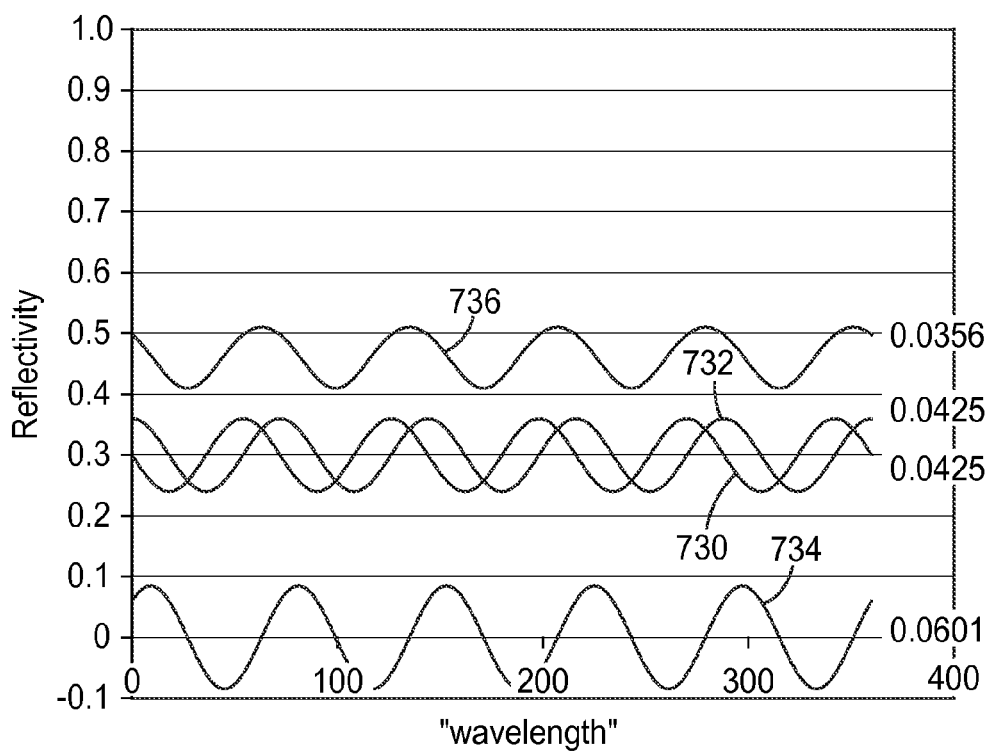

Before demonstrating the disclosed high frequency color smoothing principles in connection with multiple packet partially reflective multilayer optical film bodies of practical design, we demonstrate the principles using simple simulations that utilize reflectors (hypothetical microlayer packets) that are characterized by sinusoidally-varying reflection and transmission spectra. These simple simulations are shown in FIGS. 7a-c. In FIG. 7a, we have plotted the spectral reflectivity 710 of a first hypothetical packet and the spectral reflectivity 712 of a second hypothetical packet. These reflectivities have both been modeled to have an average reflectivity of 0.30 (30%), with sinusoidal variations therefrom over an extended wavelength range that ranges from 0 to 400 in arbitrary units. The sinusoidal variations are assumed to be high frequency and undesired. In this case the reflection spectra are intended to be flat, i.e., constant as a function of wavelength, and thus for purposes of characterizing or isolating the undesired high frequency spectral variations in this simple simulation, we select a flat line (zero order in wavelength) of reflectivity 0.30 to use as the "smoothed spectrum" for each of the first and second hypothetical packets, rather than a $3^{rd}$ order curve fit as discussed above. Subtracting that flat line from the "actual" reflectivities of the first and second hypothetical packets yields the sinusoidal components of the curves 710, 712, such sinusoidal components representing the undesired spectral variability for each of the packets. Note that the two sinusoidal curves are precisely out of phase with each other, so that peaks in the reflectivity 710 are spectrally aligned with valleys in the reflectivity 712, and valleys in the reflectivity 710 are spectrally aligned with peaks in the reflectivity 712, and the peaks and valleys have the same amplitude and width. This represents the optimum condition for removing high frequency spectral variability from the hypothetical film body. Note that the ripples are not completely reduced to zero, even in the case of equal and opposite amplitudes of the peaks and valleys. We can characterize the high frequency spectral variability of the packets as the statistical standard deviation of the sinusoidal components of the respective reflectivity curves. We refer to these high frequency variability values as $\Delta 1$ for the first packet and $\Delta 2$ for the second packet. In this case, $\Delta 1$ and $\Delta 2$ are both 0.0354, which are also labeled in FIG. 7a next to their respective reflectivity curve.

We can also calculate the mathematical difference between the sinusoidal components of the curves 710, 712, the result of which is a differential spectrum 714 which extends over the same extended wavelength range. We can then calculate the high frequency variability of the differential spectrum 714, which we refer to as the differential high frequency variability Δdiff, e.g., by taking the statistical standard deviation of the spectrum 714. In this case, Δdiff is 0.0708, which is labeled in the figure next to its respective curve.

Finally, we can also calculate, using curves 710 and 712 and Equation (1), the reflectivity of the multilayer optical film body (in this case equal to the reflectivity of the combination of the first and second packets) which would result from laminating the first and second hypothetical microlayer packets together with an optically thick material layer therebetween. The result is a combination reflection spectrum 716. Since this combination spectrum is intended to be flat, i.e., constant as a function of wavelength, for purposes of characterizing or isolating the undesired high frequency spectral variations in this simple simulation, we select a flat line (zero order in wavelength) to use as the "smoothed spectrum" for the reflectivity of the film body or combination, rather than a $3^{rd}$ order curve fit as discussed above. Subtracting that flat line, having a value equal to the average reflectivity of curve 716, from the "actual" reflectivity curve 716, yields the high frequency spectral variability component of the curve 716. We can characterize the variability of that curve component by a single number which we refer to as the combination high frequency variability Δcomb, where that number may be calculated as the statistical standard deviation of the high frequency component of the curve 716. In this case, Δcomb is 0.0015, and is labeled in FIG. 7a next to its associated curve 716.

To summarize the high frequency variability values for the hypothetical embodiment of FIG. 7a, in which the peaks and valleys of the reflectivity spectrum of one microlayer packet are precisely misaligned with those of the other microlayer packet, we have:

Δ1=0.0354;
Δ2=0.0354;
Δdiff=0.0708; and
Δcomb=0.0015.

This example shows that, when trying to minimize high frequency color (Δcomb) in the film body or combination, it is advantageous to arrange the microlayer packets such that the high frequency variability (Δdiff) of the differential spectrum is large.

We now modify the hypothetical embodiment of FIG. 7a by shifting the high frequency variations of the second microlayer packet so that, rather than the peaks and valleys of one packet being precisely misaligned with those of the other packet, the peaks and valleys of the two packets are precisely aligned. Other relevant aspects of the FIG. 7a embodiment are maintained in the embodiment of FIG. 7b, e.g., the average reflectivities of the first and second packets are still both 0.30 (30%), except the amplitude of the sinusoidal variations was increased slightly for both the first and second packets. Curve 720 represents the spectral reflectivity of the first microlayer packet, curve 722 represents the spectral reflectivity of the second microlayer packet, curve 724 represents the differential spectrum obtained by subtracting the sinusoidal components of the curves 720, 722, and curve 726 is the reflection spectrum of the combination of packets calculated from curves 720 and 722 and Equation (1). The high frequency variability values Δ1, Δ2, Δdiff, and Δcomb can be calculated in the same way as described in connection with FIG. 7a. The results for the hypothetical embodiment of FIG. 7b, in which the peaks and valleys of the reflectivity spectrum of one microlayer packet are precisely aligned with those of the other microlayer packet, are:

Δ1=0.0425;
Δ2=0.0425;
Δdiff=0; and
Δcomb=0.0508.

This example shows that, when trying to minimize high frequency color (Δcomb) in the film body or combination of packets, it is disadvantageous to arrange the microlayer packets such that the high frequency variability (Δdiff) of the differential spectrum is small. Note, however, that even though the peaks and valleys of the individual packets are precisely aligned, corresponding to the worst case scenario from a high frequency color standpoint, the color of the film body or combination, measured in terms of Δcomb, exceeds the color (measured in terms of Δ1 and Δ2) of the individual microlayer packets by only a modest amount.

We can now modify the hypothetical embodiment of FIG. 7b by shifting the high frequency variations of the second microlayer packet so that, rather than the peaks and valleys of one packet being precisely aligned with those of the other packet, the peaks and valleys of the two packets are 90 degrees out of phase, and thus neither precisely aligned nor precisely misaligned. Other relevant aspects of the FIG. 7b embodiment are maintained in the embodiment of FIG. 7c, e.g., the average reflectivities of the first and second packets are still both 0.30 (30%), and the amplitude of the sinusoidal variations is the same. Curve 730 represents the spectral reflectivity of the first microlayer packet, curve 732 represents the spectral reflectivity of the second microlayer packet, curve 734 represents the differential spectrum obtained by subtracting the sinusoidal components of the curves 730, 732, and curve 736 is the reflection spectrum of the combination of packets calculated from curves 730 and 732 and Equation (1). The high frequency variability values Δ1, Δ2, Δdiff, and Δcomb can be calculated in the same way as described in connection with FIGS. 7a and 7b. The results for the hypothetical embodiment of FIG. 7c, in which the peaks and valleys of the reflectivity spectrum of one microlayer packet are neither precisely aligned nor precisely misaligned with those of the other microlayer packet, are:

Δ1=0.0425;
Δ2=0.0425;
Δdiff=0.0601; and
Δcomb=0.0356.

This example shows again that, when trying to minimize high frequency color (ΔFB1) in the film body or combination of packets, it is advantageous to arrange the microlayer packets such that the high frequency variability (Δdiff) of the differential spectrum is large.

We will now show that these same principles can be used in examples involving more realistic or practical multilayer optical films. In some cases, we utilize transmission and/or reflection spectra that were measured for a given microlayer packet (e.g. a multilayer optical film having only one microlayer packet, which could then be laminated to another multilayer optical film of similar construction to produce a multi-packet multilayer optical film body) and/or a given multi-packet multilayer optical film body. In order to ensure the accuracy and reliability of such spectral measurements, particularly when dealing with films that may exhibit significantly different spectral properties at different positions, points, or areas of the film, it is advantageous to take such transmission and/or reflection measurements over a portion of the film that is small enough so that the measurement does not inadvertently omit, as a result of spatial averaging, the high frequency variations that the operator is trying to characterize. A sufficiently small portion for reliable measurement purposes is referred to herein as a test area. The test area may be selected such that any given spectral feature of the film body shifts in wavelength by less than a given amount, e.g., 1 nm, or 2 nm, or 5 nm, between any two portions of the test area. Note that depending on the degree of spatial uniformity of the film sample, the test area may be made relatively large (if desired) in some cases, but may need to be substantially smaller in other cases.

Figure 8:
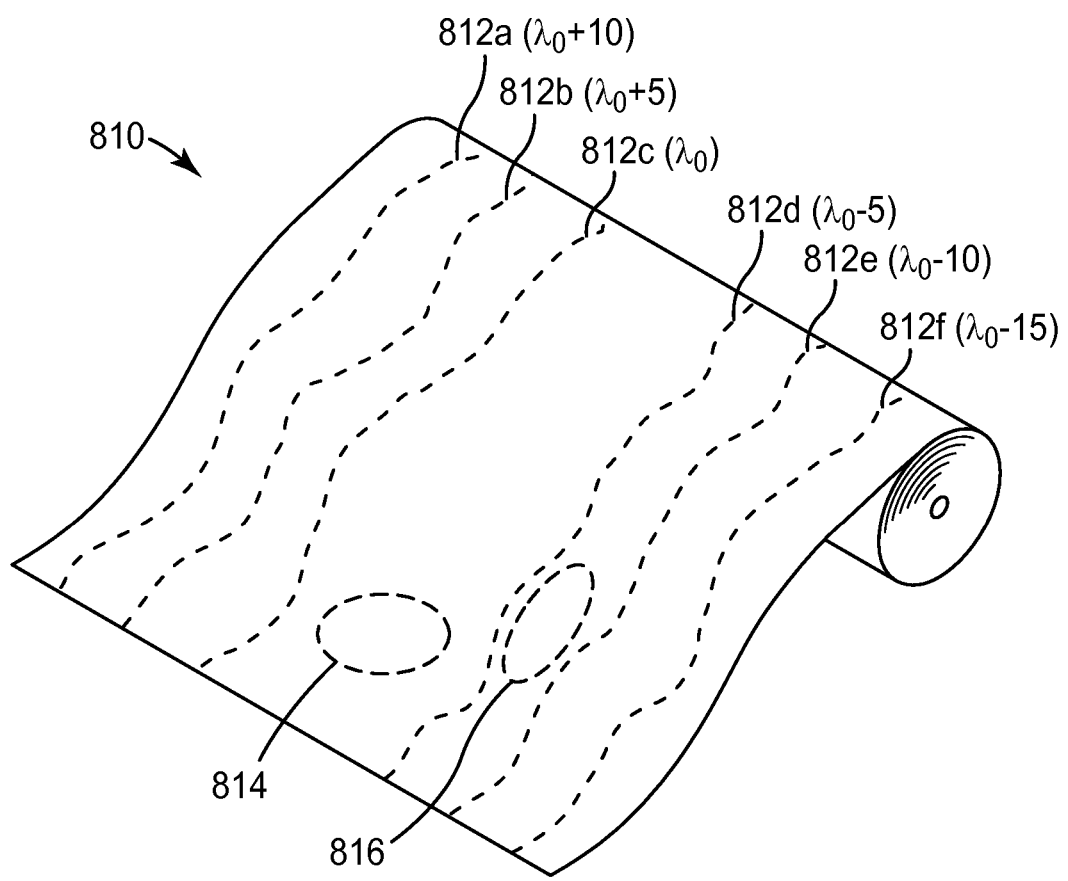
FIG. 8 is a perspective view of a multilayer optical film body, showing exemplary test areas.

Several exemplary test areas are shown in FIG. 8. In that figure, a multilayer optical film 810, which may be a single packet film that will later be laminated or otherwise joined to another multilayer optical film, or which may be a multi-packet multilayer optical film body, is shown in perspective view. The film 810 may be in the form of a flexible polymer web, suitable for storing in roll form, for example. The film 810 is partially reflective over a broad wavelength range for light polarized along at least one major axis (principal axis) of the film, and has at least one characteristic spectral feature (e.g., a peak, valley, or transition in the reflection or transmission spectrum) which can be measured, for example with a spectrophotometer. Due to film caliper variations or for other reasons, the wavelength at which the characteristic spectral feature appears is a function of position on the surface or useable area of the film. Lines 812a-f depict places on the film where the spectral feature appears at a given wavelength: along the line 812c, the feature appears at a wavelength $\lambda_0$; along the line 812a, the spectrum has shifted such that the feature appears at a wavelength $\lambda_0+10$ (e.g., if wavelength $\lambda_0$ is 600 nm, then along line 812a the feature appears at 610 nm); along the line 812f, the spectrum has shifted such that the feature appears at a wavelength $\lambda_0-15$ (585 nm if $\lambda_0$ is 600 nm); and so forth. The lines 812a-f are thus analogous to lines on a contour map. Areas 814, 816 are exemplary test areas that one may use to measure the spectral transmission or reflection at the indicated places on the film 810, if one wished to have better than a 5 nm measurement resolution. Of course, a more stringent (or more lax) requirement on measurement resolution would entail a smaller (or larger) test area. Note that the test area need not be circular, and may be elongated if the spatial uniformity of the film is better in one in-plane direction (e.g. the down-web direction) than in another in-plane direction (e.g. the cross-web direction).

Figure 9A:
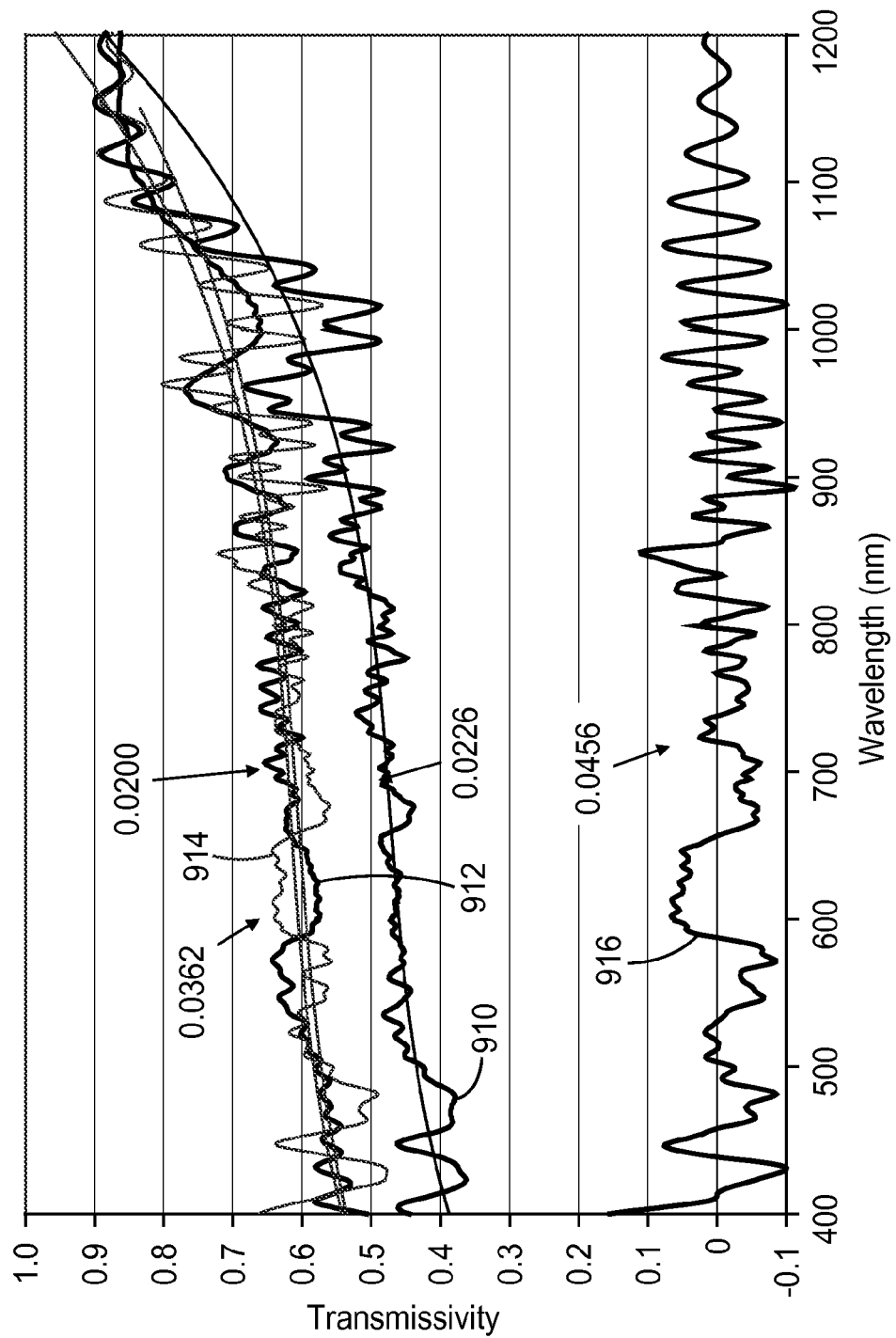
FIG. 9a is a graph of measured spectral transmission for a 2-packet multilayer optical film body, and for its two constituent microlayer packets individually after they were physically separated from each other.

Turning now to FIG. 9a, we see there measured spectral properties associated with a 2-packet reflective polarizing film body. Each microlayer packet of the film body had 275 microlayers, the microlayers being arranged in an alternating A, B pattern with a high refractive index polymer material of 90/10 coPEN (a copolyester containing 90% ethylene naphthalate repeat units and 10% ethylene terephthalate repeat units), and a low refractive index polymer material of PETg available from Eastman Chemical Company. These materials were coextruded, fed through a die, and cast onto a casting wheel (see e.g. U.S. Pat. No. 6,783,349 (Neavin et al.) and U.S. Patent Application 61/332,401, filed May 7, 2010, mentioned above). The cast web was then stretched about 2.5:1 in a length orienter, and about 6:1 in a tenter. The two microlayer packets, which were separated by an optically thick polymer layer, each had a nominally monotonic thickness gradient corresponding to a partial reflection band extending from 400 nm to about 1100 nm for normally incident light polarized along the pass axis of the film body. The polarizing film had a significant amount of reflectivity over visible and near IR wavelengths for normally incident light polarized along the in-plane pass axis, as well as for obliquely incident light.

The transmission of the 2-packet film body was measured at one location or test area on the film for normally incident light polarized along the pass axis, and the measured transmission is shown as curve 910. The test area (about 5 mm in diameter) was marked for later reference on both sides of the film body. The two microlayer packets of the film body were then separated from each other by peeling the film body apart while maintaining the individual microlayer packets intact. One of the microlayer packets, referred to here as the first microlayer packet, was adhered to a clear release liner using a layer of optically clear adhesive. This was done to reduce spectral ringing at infrared wavelengths. The marks defining the previously measured test area of the film body were used to locate the same location on the first and second microlayer packets, and the transmission of the packets were measured individually in the same way as the original 2-packet film body. Curve 912 shows the measured transmission for the first packet, and curve 914 shows the measured transmission for the second packet.

Each of the curves 910, 912, 914 was then approximated by a smoothed, best-fit curve of the form $a_0+a_1\lambda, +a_2\lambda^2+a_3\lambda^3$ between the limits of 400 and 1000 nm. These slowly varying best-fit curves are drawn in FIG. 9a with narrow linewidths, but are not labeled. (Similar non-labeled best-fit curves are also shown in FIGS. 10, 11, and 12a-d.) In each case, the best-fit curve was then subtracted from the measured transmission spectrum to isolate the high frequency component of the measured spectrum. The standard deviation of the high frequency components for each of the curves 910, 912, 914 was calculated between the limits of 400 and 850 nm, the results being $\Delta FB=\Delta comb=0.0226$, $\Delta 1=0.0200$, and $\Delta 2=0.0362$, respectively. The transmission spectra of the first and second packets were also subtracted from each other to calculate a differential spectrum, which is plotted as curve 916. The standard deviation of the differential spectrum 916, after subtracting a $3^{rd}$ order best fit curve, was calculated to be $\Delta diff=0.0456$ between the limits of 400 and 850 nm. In summary, then, we have for this example:

$\Delta 1=0.0200$;

$\Delta 2=0.0362$;

$\Delta diff=0.0456$; and $\Delta comb=0.0226$.

We performed some additional analysis to confirm that Equation (1) is reliable for predicting the spectra of optical film laminates. In particular, we used the measured transmission spectra for the first and second packets, i.e., curves 912 and 914 in FIG. 9a, to simulate a laminate of those two packets. If our methodology is reliable, the transmission spectrum we calculate for the simulated laminate should match the measured transmission spectrum 910 of the actual laminate as it existed before the peeling operation, which was used to isolate the packets. In our analysis, special consideration was given to the effects of the film/air interfaces. The original film body or laminate had two air interfaces, while the two individual packets (in the form of separate, peeled films) have a combined total of 4 film/air interfaces. Two of these air interfaces needed to be mathematically removed before the pile-of-plates formula above (Equation (1)) can be used to calculate the transmission of the simulated laminate, keeping in mind that T=1−R. To mathematically remove the excess air interfaces, the reflectivity of one air/PETg interface (refractive index of PETg is 1.564) was calculated as a function of wavelength, with dispersion effects included. The "internal reflectivity" of the first packet was then calculated by the following formula:

$$A_{int} = \frac{1 - \text{air} - (1 + \text{air}) * A}{1 - \text{air} - 2 * \text{air} * A},$$ Equation (2)

where $A_{int}$ refers to the "internal reflectivity" of the first packet, "air" refers to the calculated reflectivity of the air/PETg interface, "A" refers to the measured total transmission of the peeled film containing the first packet (which included the effects of two air/polymer interfaces), and the relationship R=1−T is assumed for all calculations. Note that the term "internal reflectivity" of a film or other body refers to the reflectivity the body would have in the absence of any interfaces at the front or back (or top or bottom, etc.) of the body due to contact with air or any other medium of different refractive index than the film. The term "internal transmission" analogously refers to the transmission the body would have in the absence of any interfaces at the front or back (or top or bottom, etc.) of the body.

After calculating the internal reflectivity $A_{int}$ of the first packet, we then calculated the transmission of the simulated laminate using Equation (1) above for each wavelength value, where the value of $A_{int}$ was used for "R1" in Equation (1), and the measured reflectivity of the second packet (which included the effects of two air/polymer interfaces) was used for "R2" in Equation (1), and where transmission T=1−R. The resulting calculated transmission spectrum for the simulated laminate is shown as curve 910a in FIG. 9b, and is plotted alongside the original measured transmission of curve 910. As the reader can see, excellent agreement is achieved between the measured and calculated reflectivities of the laminate, confirming that the transmission spectra 912, 914 obtained for the individual microlayer packets for the embodiment of FIG. 9a are reliable and that our use of Equation (1) is valid for describing the reflectivity of incoherent reflective packets.

Figure 9B:
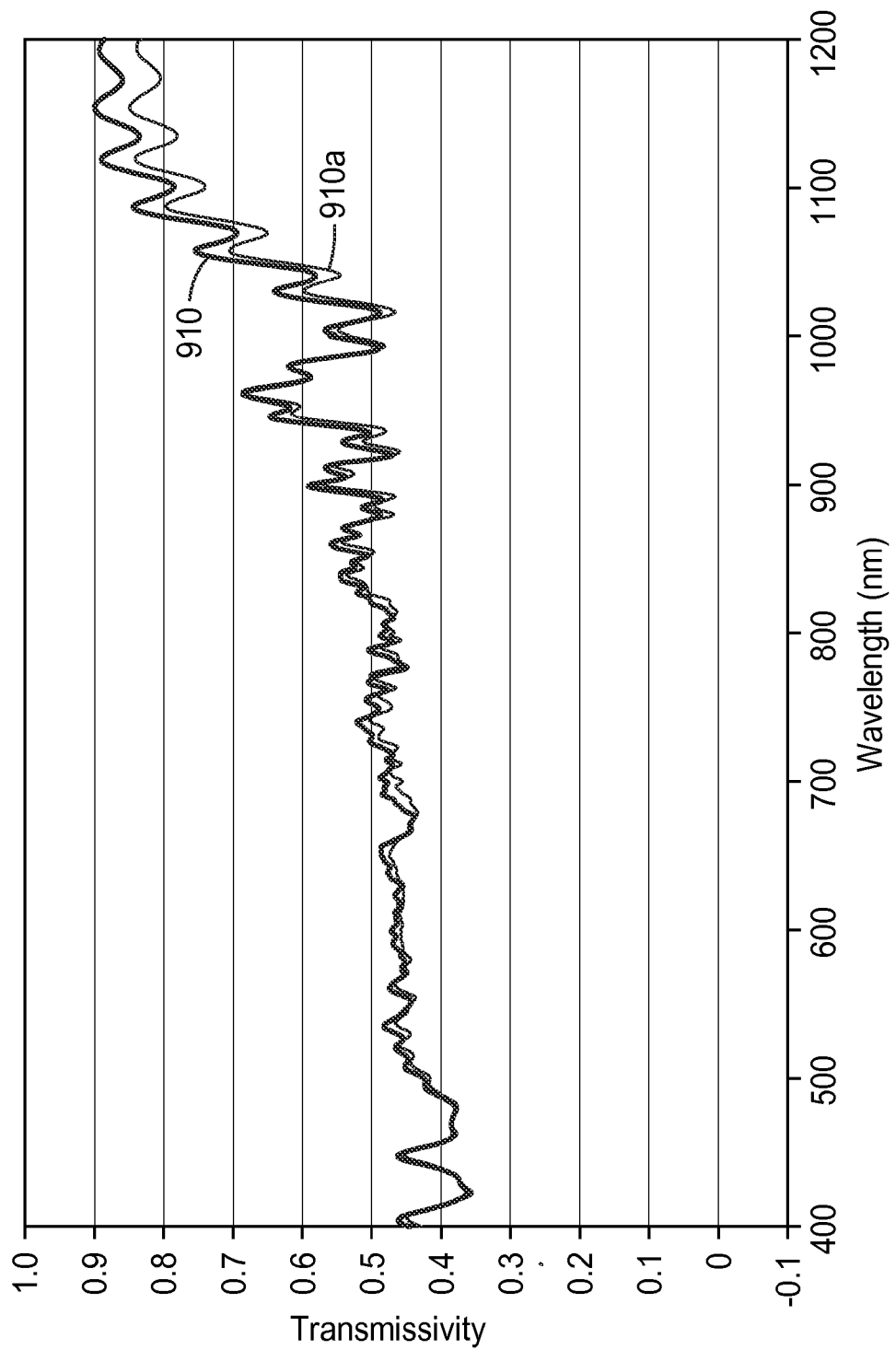
Figure 10:
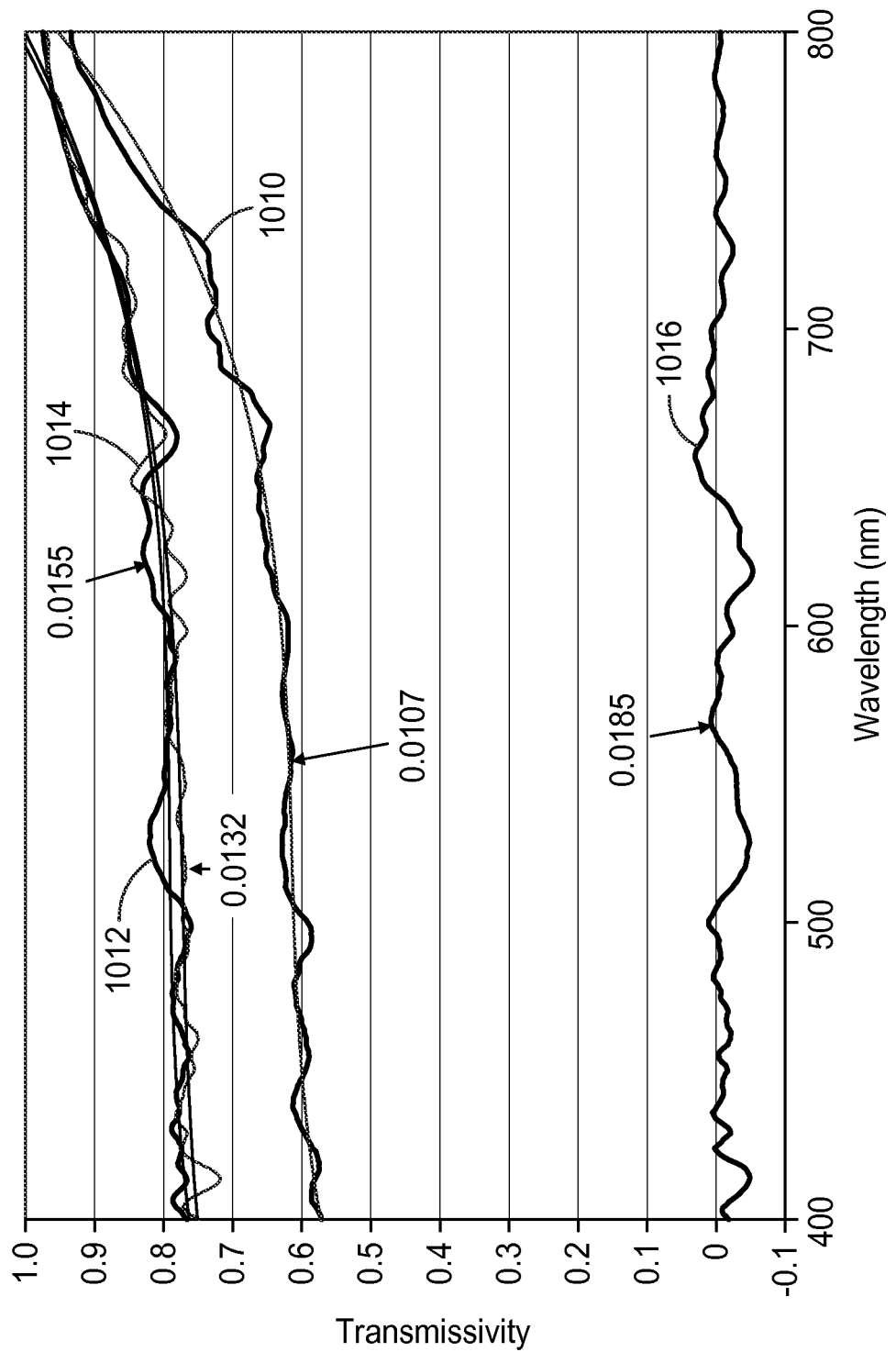
FIG. 10 is a graph showing the measured spectral transmission of another 2-packet multilayer optical film, and of its two constituent microlayer packets individually after they were physically separated from each other.

FIG. 10 shows measured spectral properties associated with another 2-packet reflective polarizing film body. Each microlayer packet of the film body had 275 microlayers, the microlayers being arranged in an alternating A, B pattern with one polymer material of polyethylene terephthalate (PET), and the other polymer material of the PETg polymer mentioned above. These materials were coextruded, fed through a die, and cast onto a casting wheel (see e.g. U.S. Pat. No. 6,783,349 (Neavin et al.) and U.S. Patent Application 61/332,401, filed May 7, 2010, mentioned above). The cast web was then stretched about 6:1 in a tenter to produce a broadband reflective polarizer multilayer optical film body. The two microlayer packets, which were connected to each other by an optically thick polymer layer, each had a nominally monotonic thickness gradient corresponding to a reflection band extending from 400 nm to about 850 nm for normally incident light polarized along the block axis of the film body. Like the reflective polarizer of FIGS. 9a-b, this reflective polarizing film body also had significant reflectivity over visible and near IR wavelengths for normally incident light polarized along the pass axis, and also for obliquely incident light. Thus, for light linearly polarized along the pass axis, including both normally incident light and obliquely incident light incident in a "pass plane" (a plane containing the surface normal and the pass axis of the film body) and p-polarized in the plane of incidence, a partial reflectivity over a broad wavelength range was observed.

The transmission spectrum of the film body was measured in a test area of the film body for p-polarized light obliquely incident in the pass plane at an angle of 60 degrees (measured relative to the surface normal, in air). The measured transmission spectrum for the film body is shown as curve 1010 in FIG. 10. The film body was then peeled apart to isolate the two microlayer packets from each other, in a manner similar to that described in connection with FIGS. 9a-b. The transmission spectra of the two packets were measured at the same test area as the original film body, and using the same incidence condition of p-polarized light incident in the pass plane at 60 degrees. The transmission of the first and second packets measured in this way are shown as curves 1012, 1014, respectively.

Each of the curves 1010, 1012, 1014 was then approximated by a smoothed, best-fit curve of the form $a_0 + a_1\lambda + a_2\lambda^2 + a_3\lambda^3$ between the limits of 400 and 750 nm. In each case, the best-fit curve was then subtracted from the measured transmission spectrum to isolate the high frequency component of the measured spectrum. The standard deviation of the high frequency components for each of the curves 1010, 1012, 1014 was calculated between the limits of 400 and 700 nm, the results being ΔFB=Δcomb=0.0107, Δ1=0.0155, and Δ2=0.0132, respectively. The transmission spectra of the first and second packets were also subtracted from each other to calculate a differential spectrum, which is plotted as curve 1016. The standard deviation of the differential spectrum 1016, after subtracting a $3^{rd}$ order best fit curve, was calculated to be Δdiff=0.0185 between the limits of 400 and 700 [?] nm. In summary, then, we have for this example:

Δ1=0.0155;
Δ2=0.0132;
Δdiff=0.0185; and
Δcomb=0.0107.

The transmission spectra measured for the two packets individually were virtually the same, differing only in the high frequency variations caused by the uncontrolled disruptions of the layer profile. The high frequency variability of the film body or laminate can clearly be seen to be smaller than that of either packet alone.

Figure 11:
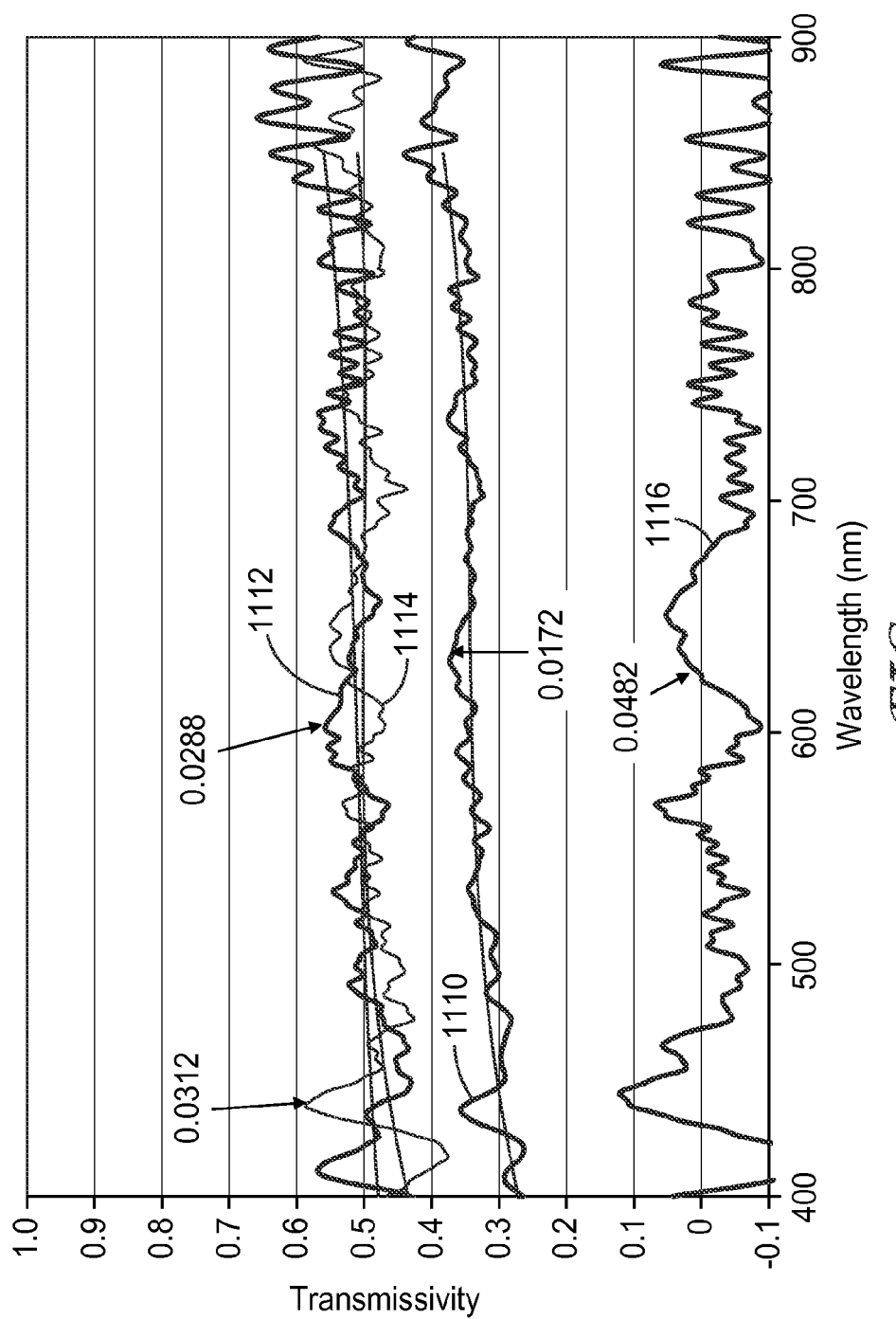
FIG. 11 is a graph showing the measured spectral transmission of two single-packet multilayer optical film bodies that were subsequently laminated together to form a 2-packet multilayer optical film body.

FIG. 11 shows measured spectral properties associated with another 2-packet multilayer optical film body. In this case, however, the microlayer packets were fabricated as separate films, and then laminated together to form the film body. A base multilayer optical film was thus constructed which had only one microlayer packet of 275 microlayers, the microlayers being arranged in an alternating A, B pattern with one polymer material being the 90/10 coPEN mentioned above, and the other polymer material being a blend of the 90/10 coPEN and PETg in a 55/45 ratio. The polymer blend exhibits a refractive index of 1.595. These materials were coextruded, fed through a die, and cast onto a casting wheel (see e.g. U.S. Pat. No. 6,783,349 (Neavin et al.)). The cast web was then biaxially oriented in an asymmetrical fashion, using a 4.0:1 length orientation and about a 6:1 tenter stretch ratio at 142 degrees C. in the width direction, followed by a high temperature heat set at 232 degrees C., to produce a broadband single packet multilayer optical film. Two pieces of this single packet base film were cut from the web at different cross-web locations on the film roll, which provided a first and second film having similar first and second microlayer packets, respectively. The transmission of each of these film pieces was measured using normally incident light that was linearly polarized along the same principal in-plane axis of the films, and the results are shown by curves 1112, 1114 in FIG. 11. These spectra are similar, but spectral features are offset or shifted in wavelength as a result of a minor caliper difference in the original base film from which the pieces were cut. Besides exhibiting substantial reflectivity at normal incidence, the films also exhibited substantial reflectivity for p-polarized light incident at 60 degrees in a plane of incidence that includes the principal in-plane axis.

The two film pieces were then laminated together (with their respective principal axes parallel to each other) with a clear pressure sensitive adhesive (PSA) to produce a 2-packet, broadband, partially reflecting multilayer optical film body or laminate. The transmission of this film body was measured in the same was as the individual pieces, and the resulting measurements are given by curve 1110 in FIG. 11.

Each of the curves 1110, 1112, 1114 was then approximated by a smoothed, best-fit curve of the form $a_0 + a_1\lambda, +a_2\lambda^2 + a_3\lambda^3$ between the limits of 400 and 850 nm. In each case, the best-fit curve was then subtracted from the measured transmission spectrum to isolate the high frequency component of the measured spectrum. The standard deviation of the high frequency components for each of the curves 1110, 1112, 1114 was calculated between the limits of 400 and 850 nm, the results being $\Delta FB = \Delta comb = 0.0172$, $\Delta 1 = 0.0288$, and $\Delta 2 = 0.0312$, respectively. The transmission spectra of the first and second packets were also subtracted from each other to calculate a differential spectrum, which is plotted as curve 1116. The standard deviation of the differential spectrum 1116, after subtracting a $3^{rd}$ order best fit curve, was calculated to be $\Delta diff = 0.0482$ between the limits of 400 and 850 nm. In summary, then, we have for this example:

$\Delta 1 = 0.0288$;
$\Delta 2 = 0.0312$;
$\Delta diff = 0.0482$; and
$\Delta comb = 0.0172$.

Here, each of the packets has a relatively large high frequency variability, compared to the substantially lower value for the film body or laminate.

Two more single packet partially reflecting broadband multilayer optical films were fabricated and their spectral properties measured. Computational analysis was then performed on the measured spectra, in such a way that several different laminated constructions or film bodies were simulated (but not actually fabricated). The computational analysis allowed us to simulate making one of the single packet films slightly thicker or thinner, causing the transmission spectrum of that film to shift to longer or shorter wavelengths, respectively. The effects of those shifts on the high frequency variability of the resultant (simulated) 2-packet film body could then be modeled and analyzed. The results are provided in FIGS. 12a-d. The point of this exercise is to demonstrate that separate multilayer optical films being made in the factory can be adjusted on-line or on-the-fly to produce a multi-packet laminate or film body that can have reduced high frequency spectral variability relative to its constituent films.

Further in regard to FIGS. 12a-d, a base multilayer optical film was constructed which had only one microlayer packet of 275 microlayers, the microlayers being arranged in an alternating A, B pattern with one polymer material being the 90/10 coPEN mentioned above, and the other polymer material being the 55/45 blend of 90/10 coPEN and PETg mentioned above. These materials were coextruded, fed through a die, and cast onto a casting wheel (see e.g. U.S. Pat. No. 6,783,349 (Neavin et al.)). The cast web was then biaxially oriented in an asymmetrical fashion, using a 3.5:1 length orientation and about a 6:1 tenter stretch ratio at 142 degrees C. in the width direction, to produce a broadband single packet multilayer optical film. Two pieces of this single packet base film were cut from the web at about the same cross-web position but at different down-web positions on the film roll, which provided a first and second film having similar first and second microlayer packets, respectively. Each film had significant reflectivity along an in-plane pass axis (principal axis) thereof. The transmission of each of these film pieces was measured using normally incident light that was linearly polarized along the pass axis of the film, and the results are shown by curves 1212a, 1214a in FIG. 12a. As can be seen, these films exhibited partial reflectivity along the pass axis, with a broad reflection band extending from 400 nm to about 1250 nm at normal incidence.

A first simulated laminate or film body was then evaluated using the curves 1212a, 1214a, in a manner analogous to that described in connection with FIG. 9b. The calculated transmission of the first film body, assuming the same incidence condition used for each of the curves 1212a, 1214a, is shown as curve 1210a in FIG. 12a. This curve is believed to be representative of the transmission one would measure on a film body made by laminating the individual film pieces together, under the given incidence condition.

Each of the curves 1210a, 1212a, 1214a was then approximated by a smoothed, best-fit curve of the form $a_0 + a_1\lambda, +a_2\lambda^2 + a_3\lambda^3$ between the limits of 400 and 1150 nm. In each case, the best-fit curve was then subtracted from the measured or calculated transmission spectrum to isolate the high frequency component of the measured/calculated spectrum. The standard deviation of the high frequency components for each of the curves 1210a, 1212a, 1214a was calculated between the limits of 400 and 950 nm, the results being $\Delta FB = \Delta comb = 0.0261$, $\Delta 1 = 0.0269$, and $\Delta 2 = 0.0231$, respectively. The transmission spectra of the first and second packets were also subtracted from each other to calculate a differential spectrum, which is plotted as curve 1216a. The standard deviation of the differential spectrum 1216a, after subtracting a $3^{rd}$ order best fit curve, was calculated to be $\Delta diff = 0.0277$ between the limits of 400 and 950 nm. In summary, then, we have for this example:

$\Delta 1 = 0.0269$;
$\Delta 2 = 0.0231$;
$\Delta diff = 0.0277$; and
$\Delta comb = 0.0261$.

A second simulated laminate or film body was then evaluated. This second simulated laminate was substantially the same as the first simulated laminate (FIG. 12a), except that the spectrum of the first single packet film (see curve 1212a in FIG. 12a) was shifted in wavelength to represent a 3% increase in the thickness of the first single packet film. The calculated transmission spectrum of the thickened first packet is shown in FIG. 12b as curve 1212b. The curve 1214b in FIG. 12b is identical to curve 1214a in FIG. 12a, and curve 1210b represents the combination of curves 1212b and 1214b using Equation (1).

Just as before, each of the curves 1210b, 1212b, 1214b was then approximated by a smoothed, best-fit curve of the form $a_0 + a_1\lambda, +a_2\lambda^2 + a_3\lambda^3$ between the limits of 400 and 1150 nm, and the best-fit curve was subtracted from the respective measured or calculated transmission spectrum to isolate the high frequency component. The standard deviation of the high frequency components for each of the curves 1210b, 1212b, 1214b was calculated between the limits of 400 and 950 nm, the results being $\Delta FB = \Delta comb = 0.0203$, $\Delta 1 = 0.0279$, and $\Delta 2 = 0.0231$, respectively. The transmission spectra of the first and second packets were again subtracted from each other to calculate a differential spectrum, which is plotted as curve 1216b. The standard deviation of the differential spectrum 1216b, after subtracting a $3^{rd}$ order best fit curve, was calculated to be $\Delta\text{diff}=0.0404$ between the limits of 400 and 950 nm. In summary, then, we have for this example:

$\Delta1=0.0279$;
$\Delta2=0.0231$;
$\Delta\text{diff}=0.0404$; and
$\Delta\text{comb}=0.0203$.

A third simulated laminate or film body was then evaluated. This third simulated laminate was substantially the same as the first simulated laminate (FIG. 12a), except that the spectrum of the first single packet film (see curve 1212a in FIG. 12a) was shifted in wavelength to represent a 2% decrease in the thickness of the first single packet film. The calculated transmission spectrum of the thinned first packet is shown in FIG. 12c as curve 1212c. The curve 1214c in FIG. 12c is identical to curve 1214a in FIG. 12a, and curve 1210c represents the combination of curves 1212c and 1214c using Equation (1).

Just as before, each of the curves 1210c, 1212c, 1214c was then approximated by a smoothed, best-fit curve of the form $a_0+a_1\lambda$, $+a_2\lambda^2+a_3\lambda^3$ between the limits of 400 and 1150 nm, and the best-fit curve was subtracted from the respective measured or calculated transmission spectrum to isolate the high frequency component. The standard deviation of the high frequency components for each of the curves 1210c, 1212c, 1214c was calculated between the limits of 400 and 950 nm, the results being $\Delta\text{FB}=\Delta\text{comb}=0.0286$, $\Delta1=0.0260$, and $\Delta2=0.0231$, respectively. The transmission spectra of the first and second packets were again subtracted from each other to calculate a differential spectrum, which is plotted as curve 1216c. The standard deviation of the differential spectrum 1216c, after subtracting a $3^{rd}$ order best fit curve, was calculated to be $\Delta\text{diff}=0.0160$ between the limits of 400 and 950 nm. In summary, then, we have for this example:

$\Delta1=0.0260$;
$\Delta2=0.0231$;
$\Delta\text{diff}=0.0160$; and
$\Delta\text{comb}=0.0286$.

Note that although nearly identical spectra are being combined, the standard deviation of the laminate is only a little higher than that of each individual film.

Figure 12A:
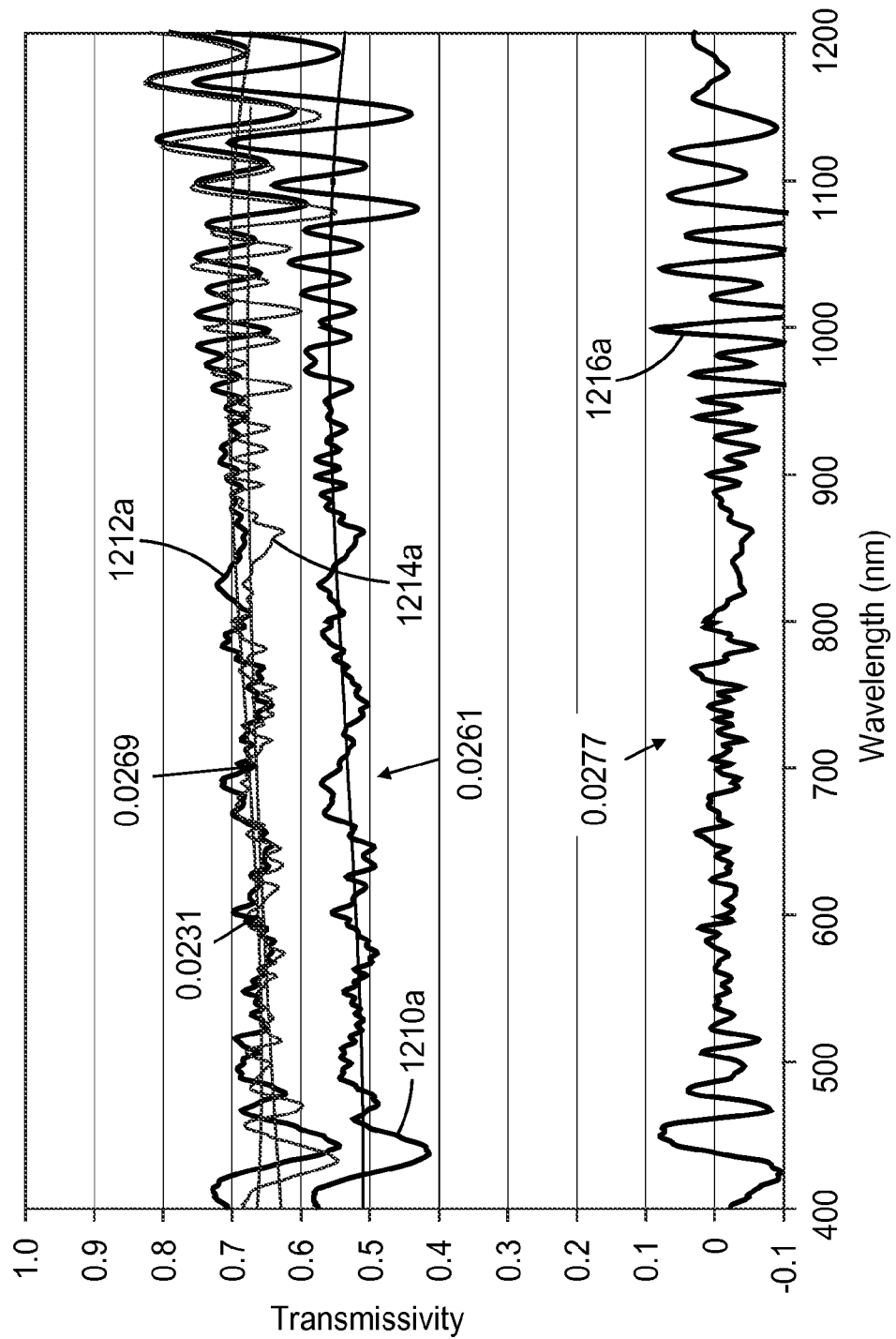
FIGS. 12a-d are additional graphs that are based on the measured spectral transmission of two single-packet multilayer optical film bodies, where some manipulation of the data was performed to simulate the fabrication of several different 2-packet multilayer optical film bodies.
Figure 12B:
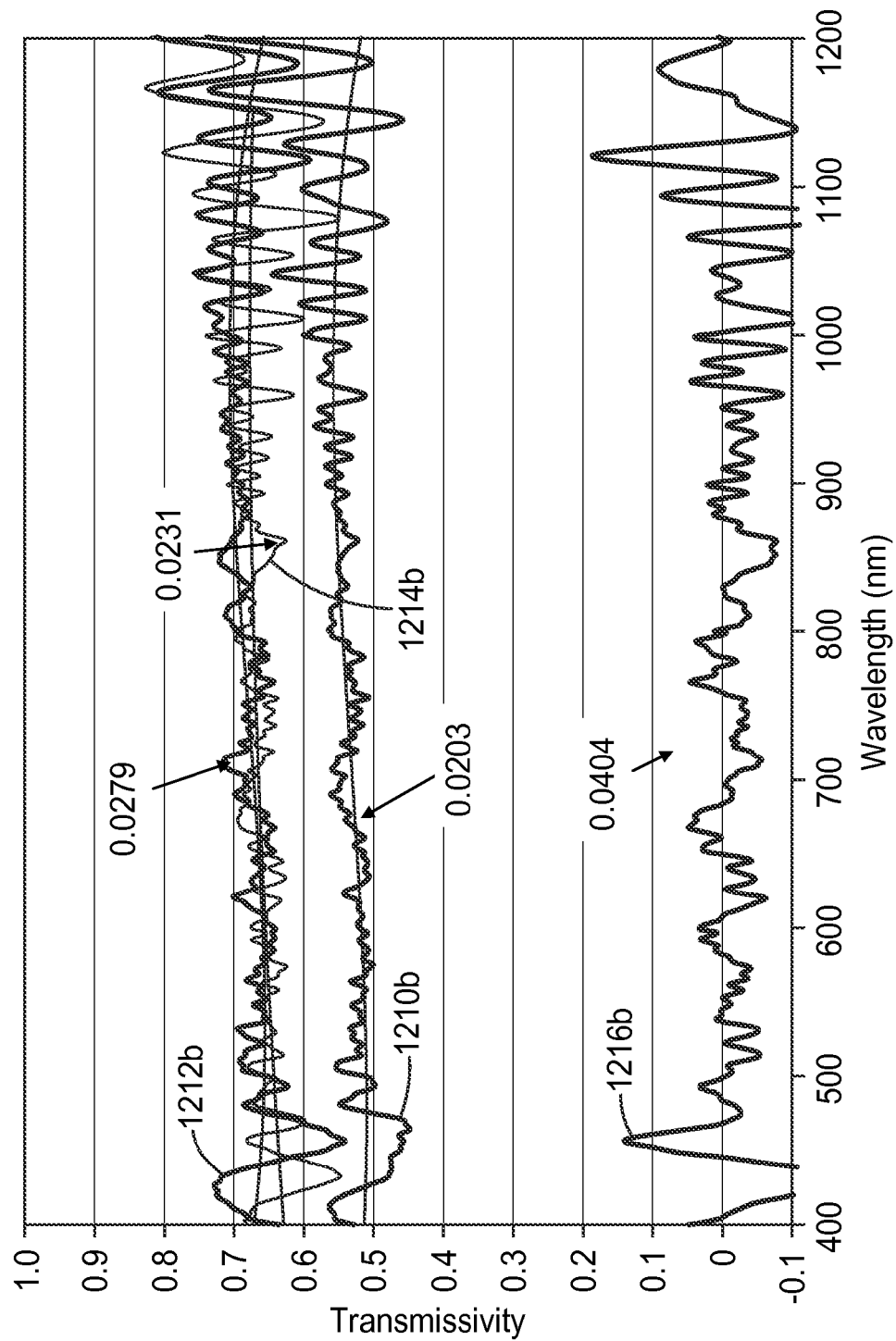
Figure 12C:
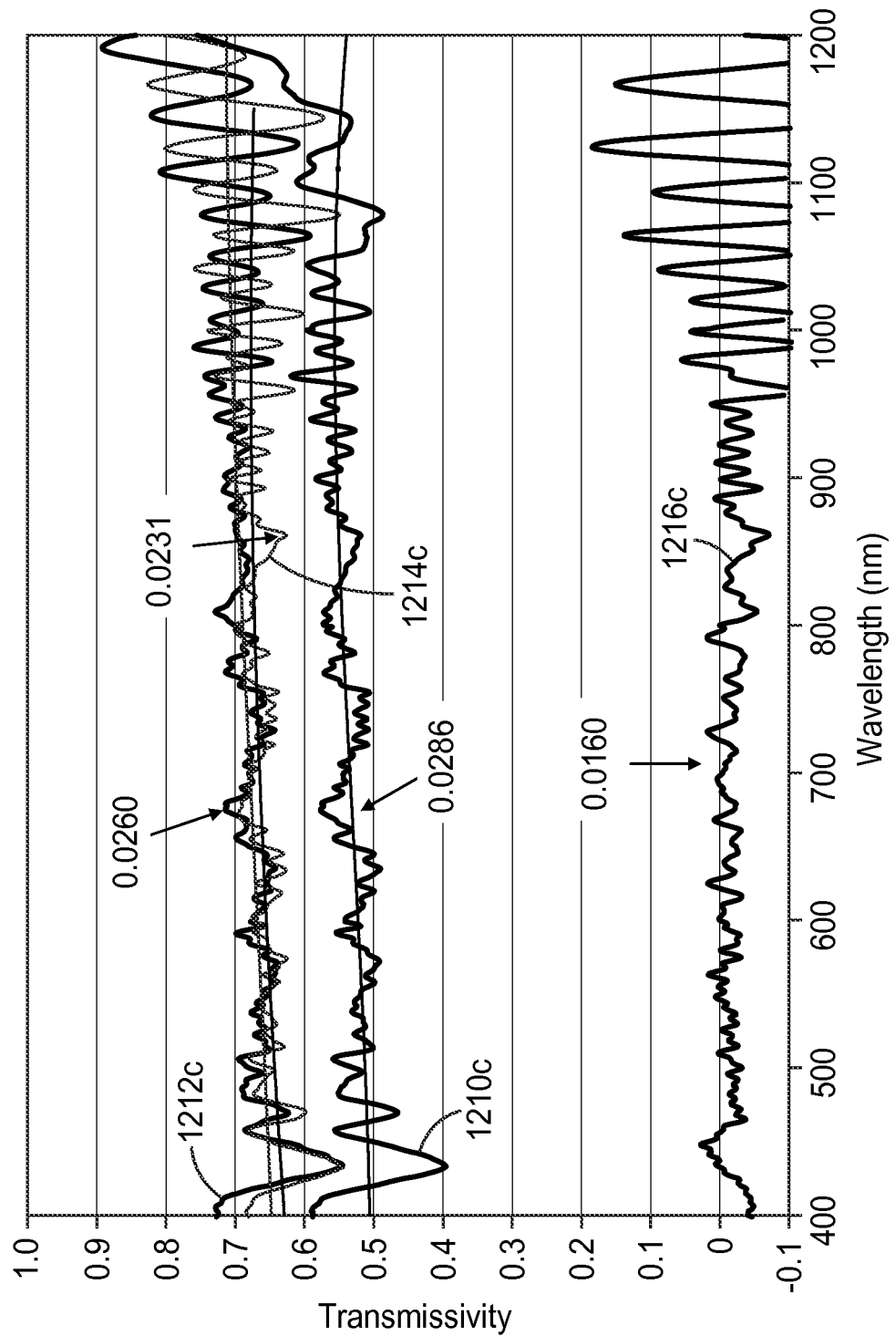

The first simulated film body of FIG. 12a was then re-evaluated for a different incidence condition. Rather than normally incident light linearly polarized along the pass axis of the film, we now used an incidence condition in which the light is obliquely incident in the pass plane at 60 degrees, the light being polarized in the plane of incidence (p-polarized). The transmission of the first and second single packet films was measured at this new incidence condition, the results plotted as curves 1212d and 1214d, respectively, in FIG. 12d.

The simulated film body was then evaluated using the curves 1212d, 1214d, in a manner analogous to that described in connection with FIG. 12a. The calculated transmission of the simulated film body, assuming the same (oblique) incidence condition used for each of the curves 1212d, 1214d, is shown as curve 1210d in FIG. 12d. This curve is believed to be representative of the transmission one would measure on a film body made by laminating the individual film pieces together, under the given (oblique) incidence condition. Air interfaces were ignored for this calculation since the surface reflectivity is negligible near the Brewster angle for p-polarized light.

Each of the curves 1210d, 1212d, 1214d was then approximated by a smoothed, best-fit curve of the form $a_0+a_1\lambda$, $+a_2\lambda^2+a_3\lambda^3$ between the limits of 400 and 950 nm, and the best-fit curve was subtracted from the respective measured or calculated transmission spectrum to isolate the high frequency component. The standard deviation of the high frequency components for each of the curves 1210d, 1212d, 1214d was calculated between the limits of 400 and 800 nm, the results being $\Delta\text{FB}=\Delta\text{comb}=0.0176$, $\Delta1=0.0219$, and $\Delta2=0.0220$, respectively. The transmission spectra of the first and second packets were again subtracted from each other to calculate a differential spectrum, which is plotted as curve 1216d. The standard deviation of the differential spectrum 1216d, after subtracting a $3^{rd}$ order best fit curve, was calculated to be $\Delta\text{diff}=0.0141$ between the limits of 400 and 800 nm. In summary, then, we have for this example:

$\Delta1=0.0219$;
$\Delta2=0.0220$;
$\Delta\text{diff}=0.0141$; and
$\Delta\text{comb}=0.0176$.

Figure 12D:
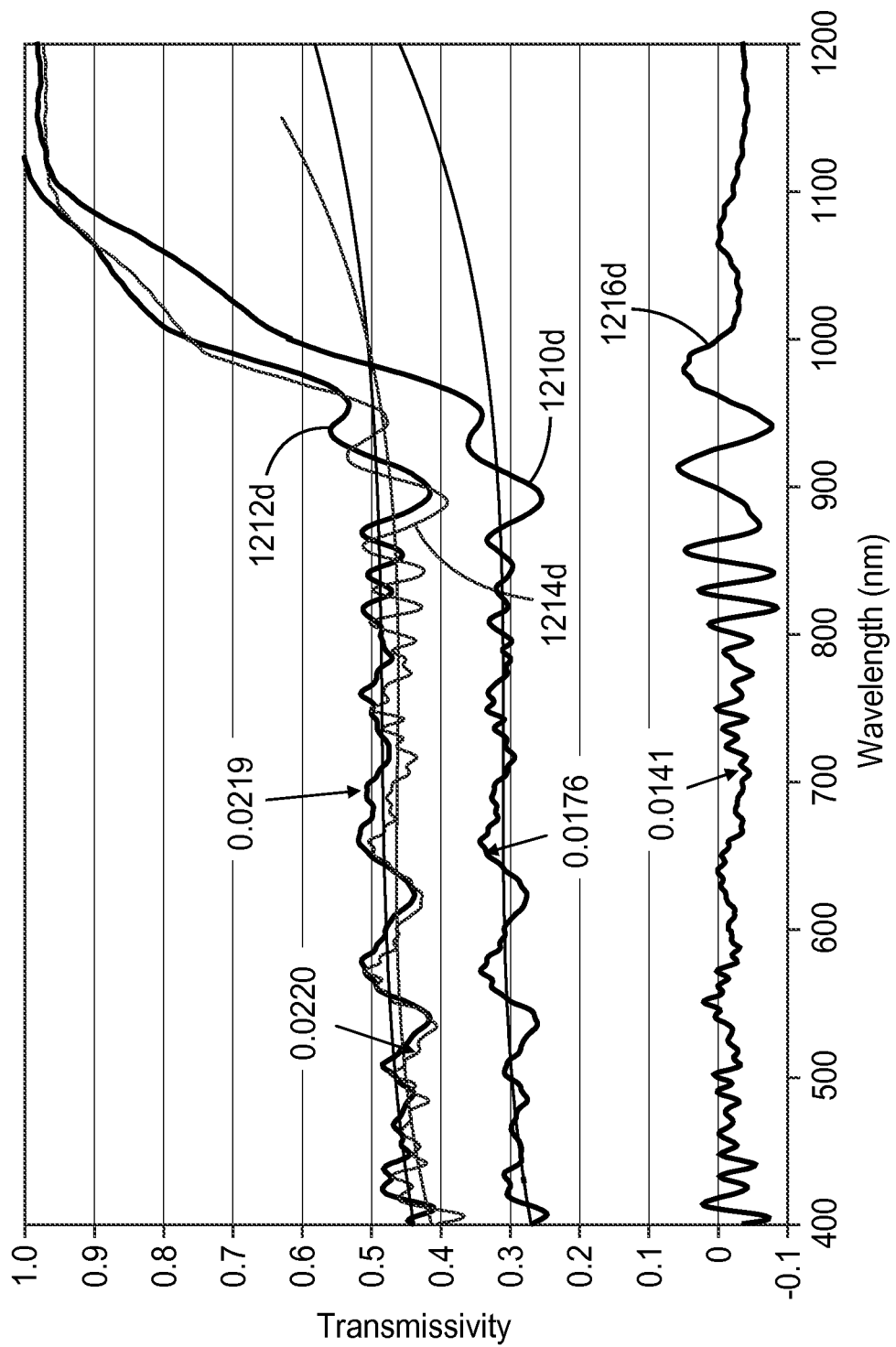

From the foregoing examples and teachings, one can see that the way in which broadband, partially reflective microlayer packets are incorporated into a multi-packet film body can be important from the standpoint of color in the film body, particularly, color associated with undesirable high frequency variability in the reflection and/or transmission spectra. Desirably, $\Delta\text{diff}$ is greater than at least one of $\Delta1$ and $\Delta2$ at least at a first test area of the film body. (The embodiment of FIG. 12d is somewhat of a counterexample, because $\Delta\text{comb}$ and $\Delta\text{FB}$ are smaller than either of $\Delta1$ or $\Delta2$, even though the difference variability $\Delta\text{diff}$ is small.) $\Delta\text{diff}$ may also be greater than each of $\Delta1$ and $\Delta2$. Furthermore, $\Delta\text{FB}$ (and/or $\Delta\text{comb}$) may be less than at least one of $\Delta1$ and $\Delta2$, or less than each of $\Delta1$ and $\Delta2$ at the first test area. In a second test area of the film body, the quantities $\Delta\text{diff}$, $\Delta1$, $\Delta2$, $\Delta\text{FB}$, and $\Delta\text{comb}$ may be referred to as $\Delta\text{diff2}$, $\Delta3$, $\Delta4$, $\Delta\text{FB2}$, and $\Delta\text{comb2}$, respectively, and $\Delta\text{diff2}$ may be less than at least one of $\Delta3$ and $\Delta4$, or less than each of $\Delta3$ and $\Delta4$. Furthermore, $\Delta\text{FB2}$ and/or $\Delta\text{comb2}$ may be greater than at least one of $\Delta3$ and $\Delta4$, or it or they may be greater than both $\Delta3$ and $\Delta4$, or it or they may be less than one or both of $\Delta3$ and $\Delta4$, while $\Delta\text{FB}$ and/or $\Delta\text{comb}$ may be less than at least one of $\Delta1$ and $\Delta2$, or less than each of $\Delta1$ and $\Delta2$.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A partially reflective multilayer optical film body having a first principal in-plane axis, comprising:
   a first packet of microlayers having a nominally monotonic layer profile; and
   a second packet of microlayers having a nominally monotonic layer profile and connected to the first packet such that at least some light can pass through the first and second packets of microlayers sequentially;
   wherein the first and second packets are each configured to partially transmit and partially reflect, over an extended wavelength range, normally incident light linearly polarized along the first principal in-plane axis;
   wherein the first and second packets, in combination, have a first combined internal transmission in a range from 0.05 (5%) to 0.95 (95%) for the normally incident light when averaged over the extended wavelength range;
   wherein the first and second packets, in combination, have a second combined internal transmission for oblique light that is (a) incident at 60 degrees in a first principal plane containing the first principal in-plane axis, and (b) linearly polarized in the first principal plane, the second combined internal transmission being in a range from 0.1 (10%) to 0.9 (90%) when averaged over the extended wavelength range;
   wherein, at least in a first test area of the multilayer optical film body, a combined high frequency spectral variability ($\Delta$comb) of the first and second packets in combination is less than a first high frequency spectral variability ($\Delta 1$) of the first packet by itself; and
   wherein a reflection band of the first packet and a reflection band of the second packet overlap by at least 70%.

2. The film body of claim 1, wherein in at least the first test area, the combined high frequency spectral variability is also less than a second high frequency spectral variability ($\Delta 2$) of the second packet by itself.

3. The film body of claim 2, wherein the first high frequency spectral variability $\Delta 1$, the second high frequency spectral variability $\Delta 2$, and the combined high frequency spectral variability $\Delta$comb are all evaluated for the normally incident light over the extended wavelength range.

4. The film body of claim 3, wherein the extended wavelength range comprises at least a majority of a range from 400 to 700 nm.

5. The film body of claim 4, wherein the extended wavelength range extends from 420 nm to 680 nm.

6. The film body of claim 4, wherein the extended wavelength range extends from 420 nm to a wavelength greater than 680 nm.

7. The film body of claim 2, wherein the first high frequency spectral variability $\Delta 1$, the second high frequency spectral variability $\Delta 2$, and the combined high frequency spectral variability $\Delta$comb are all evaluated for the obliquely incident light over the extended wavelength range.

8. The film body of claim 1, wherein, at least in the first test area:
   the first packet of microlayers exhibits a first transmission spectrum over the extended wavelength range for the normally incident light, the first transmission spectrum having the first high frequency spectral variability $\Delta 1$;
   the second packet of microlayers exhibits a second transmission spectrum over the extended wavelength range for the normally incident light, the second transmission spectrum having the second high frequency spectral variability $\Delta 2$;
   a difference between the first and second transmission spectra yields a first differential transmission spectrum over the extended wavelength range, the first differential transmission spectrum having a first differential high frequency spectral variability ($\Delta$diff); and
   the first differential high frequency spectral variability $\Delta$diff is greater than at least one of the first high frequency spectral variability $\Delta 1$ and the second high frequency spectral variability $\Delta 2$.

9. The film body of claim 8, wherein the first differential high frequency spectral variability $\Delta$diff is greater than each of the first high frequency spectral variability $\Delta 1$ and the second high frequency spectral variability $\Delta 2$.

10. The film body of claim 8, wherein the first high frequency spectral variability $\Delta 1$ is based on a difference between the first transmission spectrum and a first best-fit curve to the first transmission spectrum over the wavelength range of interest, the first best-fit curve being of the form $a_0 + a_1\lambda, + a_2\lambda^2 + a_3\lambda^3$.

11. The film body of claim 8, wherein the reflection band of the first packet and the reflection band of the second packet each extend over a major portion of a visible spectrum.

12. The film body of claim 11, wherein the reflection band of the first packet and the reflection band of the second packet each extend over at least the visible spectrum.

13. The film body of claim 8, wherein the partially reflective multilayer film body is a two packet multilayer optical film body.

14. The film body of claim 8, wherein:
   the first high frequency spectral variability $\Delta 1$ is based on a difference between the first internal transmission spectrum and a first best-fit curve to the first internal transmission spectrum over the wavelength range of interest, the first best-fit curve being of the form $a_0 + a_1\lambda, + a_2\lambda^2 + a_3\lambda^3$; and
   the second high frequency spectral variability $\Delta 2$ is based on a difference between the second internal transmission spectrum and a second best-fit curve to the second internal transmission spectrum over the wavelength range of interest, the second best-fit curve also being of the form $a_0 + a_1\lambda, + a_2\lambda^2 + a_3\lambda^3$;
   the first differential high frequency spectral variability $\Delta$diff is based on a difference between the first differential transmission spectrum and a first differential best-fit curve to the first differential transmission spectrum over the wavelength range of interest, the first differential best-fit curve also being of the form $a_0 + a_1\lambda, + a_2\lambda^2 + a_3\lambda^3$;
   the first and second packets in combination exhibit a first combination transmission spectrum over the extended wavelength range for the normally incident light, the first combination transmission spectrum having the combined high frequency spectral variability $\Delta$comb; and
   the combined high frequency spectral variability $\Delta$comb is based on a difference between the first combination transmission spectrum and a first combination best-fit curve to the first combination transmission spectrum over the wavelength range of interest, the first combination best-fit curve also being of the form $a_0 + a_1\lambda, + a_2\lambda^2 + a_3\lambda^3$.

15. The film body of claim 14, wherein:
the first high frequency spectral variability Δ1 is a standard deviation of the difference between the first internal transmission spectrum and the first best-fit curve;
the second high frequency spectral variability Δ2 is a standard deviation of the difference between the second internal transmission spectrum and the second best-fit curve;
the first differential high frequency spectral variability Δdiff is a standard deviation of the difference between the first differential transmission spectrum and the first differential best-fit curve; and
the combined high frequency spectral variability Δcomb is a standard deviation of the difference between the first combination transmission spectrum and the first combination best-fit curve.

16. The film body of claim 1, wherein the film body is a reflective polarizer, and wherein the first principal in-plane axis is a pass axis of the reflective polarizer.

17. The film body of claim 1, wherein the film body is a partial reflector having substantially the same reflectivity for normally incident light polarized along the first principal in-plane axis as for normally incident light polarized along a second in-plane axis perpendicular to the first principal in-plane axis.

18. The film body of claim 1, wherein the first test area is selected such that any given spectral feature of the film body shifts in wavelength by less than 1 nm between any two portions of the first test area.

19. The film body of claim 1, wherein, in at least a second test area of the multilayer optical film body, a second combined high frequency spectral variability (Δcomb2) of the first and second packets in combination is greater than at least one of a third high frequency spectral variability (Δ3) of the first packet by itself and a fourth high frequency spectral variability (Δ4) of the second packet by itself.

20. The film body of claim 19, wherein, in the second test area, a difference spectrum between a transmission spectrum of the first packet and a transmission spectrum of the second packet has a second differential high frequency spectral variability Δdiff2, and wherein the second differential high frequency spectral variability Δdiff2 is less than at least one of the third high frequency spectral variability Δ3 and the fourth high frequency spectral variability Δ4.

21. The film body of claim 1, wherein the reflection band of the first packet and the reflection band of the second packet each extend over a major portion of a visible spectrum.

22. The film body of claim 21, wherein the reflection band of the first packet and the reflection band of the second packet each extend over at least the visible spectrum.

23. The film body of claim 1, wherein the partially reflective multilayer film body is a two packet multilayer optical film body.

24. The film body of claim 1, wherein the partially reflective multilayer film body includes no microlayer packets other than the first and second packets.

25. The film body of claim 1, wherein the reflection band of the first packet and the reflection band of the second packet overlap by at least 80%.

26. The film body of claim 1, wherein the reflection band of the first packet and the reflection band of the second packet overlap by at least 90%.

27. A method of making a partially reflective multilayer optical film body, comprising:
providing a first and second packet of microlayers each having a nominally monotonic layer profile and, configured to partially transmit and partially reflect, over an extended wavelength range, normally incident light linearly polarized along a first principal in-plane axis of the film body; and
connecting the first packet of microlayers to the second packet of microlayers to form the multilayer optical film body, wherein at least some light can pass through the first and second packets of microlayers sequentially;
wherein the connecting is carried out such that:
the first and second packets, in combination, have a first combined internal transmission in a range from 0.05 (5%) to 0.95 (95%) for the normally incident light when averaged over the extended wavelength range;
the first and second packets, in combination, have a second combined internal transmission for oblique light that is (a) incident at 60 degrees in a first principal plane containing the first principal in-plane axis, and (b) linearly polarized in the first principal plane, the second combined internal transmission being in a range from 0.1 (10%) to 0.9 (90%) when averaged over the extended wavelength range;
a reflection band of the first packet and a reflection band of the second packet overlap by at least 70%; and
at least in a first test area of the multilayer optical film body, a combined high frequency spectral variability (Δcomb) of the first and second packets in combination is less than a first high frequency spectral variability (Δ1) of the first packet by itself.

28. The method of claim 27, wherein the connecting is also carried out such that the combined high frequency spectral variability Δcomb is less than a second high frequency spectral variability (Δ2) of the second packet by itself.

29. The method of claim 27, wherein the providing the first and second packets and the connecting are accomplished by forming an extruded multilayer web and stretching the web to simultaneously form the first and second packets of microlayers.

30. The method of claim 27, wherein the providing the first and second packets is accomplished by forming a first multilayer optical film that includes the first packet of microlayers and separately forming a second multilayer optical film that includes the second packet of microlayers, and the connecting is accomplished by laminating the first multilayer optical film to the separate second multilayer optical film.

31. The method of claim 27, wherein, at least in the first test area:
the first packet of microlayers exhibits a first transmission spectrum over the extended wavelength range for the normally incident light, the first transmission spectrum having the first high frequency spectral variability Δ1;
the second packet of microlayers exhibits a second transmission spectrum over the extended wavelength range for the normally incident light, the second transmission spectrum having the second high frequency spectral variability Δ2; and
a difference between the first and second transmission spectra yields a first differential transmission spectrum over the extended wavelength range, the first differential transmission spectrum having a first differential high frequency spectral variability Δdiff;
and wherein the connecting is carried out such that the first differential high frequency spectral
variability Δdiff is greater than at least one of the first high frequency spectral variability Δ1 and the second high frequency spectral variability Δ2.

32. The method of claim 31, wherein the connecting is carried out such that the first differential high frequency spectral variability Δdiff is greater than each of the first high frequency spectral variability Δ1 and the second high frequency spectral variability Δ2.

* * * * *